(12) United States Patent
Grant et al.

(10) Patent No.: US 12,343,974 B2
(45) Date of Patent: *Jul. 1, 2025

(54) FIBERGLASS INSULATION PRODUCT

(71) Applicant: Owens Corning Intellectual Capital, LLC

(72) Inventors: Larry J. Grant, Westerville, OH (US); Ronald A. Houpt, Newark, OH (US); Teno Boone, Columbus, OH (US); Toni Elwell Newsome, Pataskala, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,297

(22) Filed: Oct. 5, 2023

(65) Prior Publication Data

US 2024/0025142 A1 Jan. 25, 2024

Related U.S. Application Data

(63) Continuation of application No. 17/114,625, filed on Dec. 8, 2020, now Pat. No. 11,813,833.

(Continued)

(51) Int. Cl.
*B32B 5/02* (2006.01)
*B32B 17/02* (2006.01)
(Continued)

(52) U.S. Cl.
CPC ............... *B32B 5/02* (2013.01); *B32B 17/02* (2013.01); *D04H 1/4218* (2013.01); *D04H 1/64* (2013.01);
(Continued)

(58) Field of Classification Search
CPC ...... E04B 1/7662; D04H 1/4218; D04H 1/64; D04H 1/72
See application file for complete search history.

(56) References Cited

U.S. PATENT DOCUMENTS 2,128,549 A * 8/1938 Zier .................... E04B 1/7666
52/407.3
2,756,158 A 7/1956 Hahn et al.
(Continued)

FOREIGN PATENT DOCUMENTS

CA 1228557 A 10/1987
CA 2308855 A1 * 6/1999
(Continued)

OTHER PUBLICATIONS

International Search Report and Written Opinion from PCT/US20/63696 dated Mar. 2, 2021.
(Continued)

*Primary Examiner* — James M Ference
(74) *Attorney, Agent, or Firm* — Calfee, Halter & Griswold LLP (57) ABSTRACT

A fibrous insulation product having a plurality of randomly oriented glass fibers and a binder composition that holds the glass fibers together is disclosed. The fibrous insulation product has an R-value in the range of 10 to 54 and, after curing, has a density, when uncompressed, in the range of 0.30 pcf to 2.7 pcf. Furthermore, the fibrous insulation product includes glass fibers that, prior to the application of the binder composition, have an average fiber diameter in the range of 15 HT to 19 HT and a quantity of binder that is in the range of 2% to 10% by weight of the fibrous insulation product. The fibrous insulation product also has an average fiber diameter to density ratio (Fd/D) of less than or equal to 40 and a comfort factor less than or equal to 3.417(Fd/D)+60.

18 Claims, 3 Drawing Sheets

Related U.S. Application Data (60) Provisional application No. 62/945,334, filed on Dec. 9, 2019.

(51) Int. Cl.
  *D04H 1/4218* (2012.01)
  *D04H 1/64* (2012.01)
  *D04H 1/72* (2012.01)
  *E04B 1/76* (2006.01)

(52) U.S. Cl.
  CPC .............. *D04H 1/72* (2013.01); *E04B 1/7662* (2013.01); *B32B 2250/02* (2013.01); *B32B 2262/101* (2013.01); *B32B 2307/304* (2013.01); *B32B 2307/72* (2013.01); *B32B 2307/732* (2013.01)

(56) References Cited

U.S. PATENT DOCUMENTS

| | | | |
|---|---|---|---|
| 2,946,371 A | 7/1960 | Stephens et al. | |
| 3,055,831 A | 9/1962 | Barnett et al. | |
| 3,199,714 A | 8/1965 | Bodendorf et al. | |
| 3,920,868 A | 11/1975 | Hammer et al. | |
| 4,114,335 A | 9/1978 | Carroll | |
| 4,337,666 A | 7/1982 | Bhattacharyya et al. | |
| 4,357,379 A | 11/1982 | Sloan et al. | |
| 4,613,627 A | 9/1986 | Sherman et al. | |
| 4,632,685 A | 12/1986 | Debouzie et al. | |
| 4,674,674 A | 6/1987 | Patterson et al. | |
| 4,777,763 A | 10/1988 | Shannon et al. | |
| 4,794,728 A | 1/1989 | Tsukada et al. | |
| 4,866,905 A | 9/1989 | Bihy et al. | |
| 4,923,547 A | 5/1990 | Yamaji et al. | |
| 5,244,695 A | 9/1993 | Davidowich et al. | |
| 5,298,694 A | 3/1994 | Thompson et al. | |
| 5,300,192 A | 4/1994 | Hansen et al. | |
| 5,318,990 A | 6/1994 | Strauss | |
| 5,342,680 A | 8/1994 | Randall | |
| 5,349,041 A | 9/1994 | Blum et al. | |
| 5,503,920 A | 4/1996 | Alkire et al. | |
| 5,508,079 A | 4/1996 | Grant et al. | |
| 5,600,919 A | 2/1997 | Kummermehr et al. | |
| 5,609,934 A | 3/1997 | Fay | |
| 5,644,880 A | 7/1997 | Lehnert et al. | |
| 5,660,900 A | 8/1997 | Andersen et al. | |
| 5,661,213 A | 8/1997 | Arkens et al. | |
| 5,679,145 A | 10/1997 | Andersen et al. | |
| 5,698,298 A | 12/1997 | Jackson et al. | |
| 5,743,985 A | 4/1998 | Ernest et al. | |
| 5,755,900 A | 5/1998 | Weir et al. | |
| 5,763,524 A | 6/1998 | Arkens et al. | |
| 5,810,961 A | 9/1998 | Andersen et al. | |
| 5,948,833 A | 9/1999 | Jilek et al. | |
| 5,977,232 A | 11/1999 | Arkens et al. | |
| 6,030,673 A | 2/2000 | Andersen et al. | |
| 6,042,911 A * | 3/2000 | Berdan, II | E04B 1/78 |
| | | | 428/36.1 |
| 6,068,907 A | 5/2000 | Beauregard | |
| 6,071,994 A | 6/2000 | Hummerich et al. | |
| 6,079,153 A | 6/2000 | Templeton | |
| 6,099,773 A | 8/2000 | Reck et al. | |
| 6,119,424 A * | 9/2000 | Martin | E04B 9/001 |
| | | | 52/407.3 |
| 6,120,873 A | 9/2000 | Grant et al. | |
| 6,123,172 A | 9/2000 | Byrd et al. | |
| 6,128,884 A * | 10/2000 | Berdan | E04B 1/767 |
| | | | 52/407.3 |
| 6,136,916 A | 10/2000 | Arkens et al. | |
| 6,146,746 A | 11/2000 | Reck et al. | |
| 6,150,002 A | 11/2000 | Varona | |
| 6,191,057 B1 | 2/2001 | Patel et al. | |
| 6,221,973 B1 | 4/2001 | Arkens et al. | |
| 6,227,009 B1 | 5/2001 | Cusick et al. | |
| 6,274,661 B1 | 8/2001 | Chen et al. | |
| 6,299,936 B1 | 10/2001 | Reck et al. | |
| 6,305,495 B1 | 10/2001 | Keegan | |
| 6,331,350 B1 | 12/2001 | Taylor et al. | |
| 6,379,770 B2 | 4/2002 | Vair et al. | |
| 6,399,694 B1 | 6/2002 | Mcgrath et al. | |
| 6,443,256 B1 | 9/2002 | Baig | |
| 6,511,561 B1 | 1/2003 | Kohlhammer et al. | |
| 6,551,951 B1 | 4/2003 | Fay et al. | |
| 6,557,313 B1 * | 5/2003 | Alderman | E04B 1/7662 |
| | | | 52/407.3 |
| 6,699,945 B1 | 3/2004 | Chen et al. | |
| 6,734,237 B1 | 5/2004 | Taylor et al. | |
| 6,759,116 B2 | 7/2004 | Edlund | |
| 6,774,071 B2 | 8/2004 | Horner et al. | |
| 6,780,356 B1 | 8/2004 | Putt et al. | |
| 6,803,439 B2 | 10/2004 | Taylor | |
| 6,818,694 B2 | 11/2004 | Hindi et al. | |
| 6,838,163 B2 | 1/2005 | Smith et al. | |
| 6,849,683 B2 | 2/2005 | Husemoen et al. | |
| 6,884,838 B2 | 4/2005 | Taylor et al. | |
| 6,884,849 B2 | 4/2005 | Chen et al. | |
| 6,893,711 B2 | 5/2005 | Williamson et al. | |
| 6,933,349 B2 | 8/2005 | Chen et al. | |
| 6,939,818 B2 | 9/2005 | Drax et al. | |
| 6,951,602 B1 | 10/2005 | Reuter et al. | |
| 7,026,390 B2 | 4/2006 | O'Brien-Bernini et al. | |
| 7,067,579 B2 | 6/2006 | Taylor et al. | |
| 7,141,284 B2 | 11/2006 | Newton et al. | |
| 7,141,626 B2 | 11/2006 | Rodrigues et al. | |
| 7,157,524 B2 | 1/2007 | Chen et al. | |
| 7,199,179 B2 | 4/2007 | Clamen et al. | |
| 7,241,487 B2 | 7/2007 | Taylor et al. | |
| 7,300,892 B2 | 11/2007 | Porter | |
| 7,314,557 B2 | 1/2008 | Beaufils et al. | |
| 7,338,702 B2 | 3/2008 | Swales et al. | |
| 7,351,673 B1 | 4/2008 | Groh et al. | |
| 7,377,084 B2 | 5/2008 | Swiszcz et al. | |
| 7,427,575 B2 | 9/2008 | Shaffer | |
| 7,458,235 B2 | 12/2008 | Beaufils et al. | |
| 7,459,490 B2 | 12/2008 | Husemoen et al. | |
| 7,476,427 B2 | 1/2009 | Ruid et al. | |
| 7,547,375 B2 | 6/2009 | Jaffee et al. | |
| 7,585,454 B2 | 9/2009 | Noga et al. | |
| 7,641,764 B2 | 1/2010 | Yoshida et al. | |
| 7,687,416 B2 | 3/2010 | Choi | |
| 7,743,644 B2 | 6/2010 | O'Leary | |
| 7,803,727 B2 | 9/2010 | Aseere et al. | |
| 7,807,592 B2 | 10/2010 | Bland et al. | |
| 7,824,762 B2 | 11/2010 | Ziegler | |
| 7,829,488 B2 | 11/2010 | Bennett | |
| 7,833,638 B2 | 11/2010 | Zheng et al. | |
| 7,842,382 B2 | 11/2010 | Helbing | |
| 7,893,154 B2 | 2/2011 | Van Herwijnen et al. | |
| 7,989,370 B2 | 8/2011 | Currier et al. | |
| 7,993,724 B2 | 8/2011 | Chacko et al. | |
| 8,007,886 B2 | 8/2011 | Tierney et al. | |
| 8,017,531 B2 | 9/2011 | Ahluwalia et al. | |
| 8,044,168 B2 | 10/2011 | Gudik-Sorensen | |
| 8,069,629 B2 | 12/2011 | Rockwell et al. | |
| 8,084,379 B2 | 12/2011 | Hogan et al. | |
| 8,114,210 B2 | 2/2012 | Hampson et al. | |
| 8,118,973 B2 | 2/2012 | Granger | |
| 8,127,509 B2 | 3/2012 | Propst | |
| 8,133,952 B2 | 3/2012 | Pisanova et al. | |
| 8,148,277 B2 | 4/2012 | Shooshtari et al. | |
| 8,161,703 B2 | 4/2012 | Peeters | |
| 8,163,664 B2 | 4/2012 | Weller, Jr. | |
| 8,178,600 B2 | 5/2012 | Kelly | |
| 8,197,587 B2 | 6/2012 | Jaffrennou et al. | |
| 8,209,904 B2 | 7/2012 | Bouwens et al. | |
| 8,209,930 B2 | 7/2012 | Babbitt et al. | |
| 8,211,974 B2 | 7/2012 | Shooshtari et al. | |
| 8,232,334 B2 | 7/2012 | Kelly et al. | |
| 8,246,785 B2 | 8/2012 | Granger | |
| 8,283,266 B2 | 10/2012 | Jaffee et al. | |
| 8,299,153 B2 | 10/2012 | Kelly | |
| 8,329,798 B2 | 12/2012 | Clamen et al. | |
| 8,329,817 B2 | 12/2012 | Espiard et al. | |
| 8,357,746 B2 | 1/2013 | Shooshtari | |

(56) References Cited

U.S. PATENT DOCUMENTS

| | | | |
|---|---|---|---|
| 8,424,262 B2 | 4/2013 | Deblander et al. | |
| 8,486,516 B2 | 7/2013 | Hauber et al. | |
| 8,552,140 B2 | 10/2013 | Swift | |
| 8,603,631 B2 | 12/2013 | Helbing | |
| 8,604,122 B2 | 12/2013 | Kelly | |
| 8,607,929 B2 | 12/2013 | Bliton et al. | |
| 8,623,234 B2 | 1/2014 | Jaffrennou et al. | |
| 8,650,913 B2 | 2/2014 | Chacko et al. | |
| 8,652,579 B2 | 2/2014 | Shooshtari et al. | |
| 8,791,198 B2 | 7/2014 | Miller et al. | |
| 8,808,443 B2 | 8/2014 | Jaffrennou | |
| 8,815,382 B2 | 8/2014 | Robinson, Jr. | |
| 8,864,893 B2 | 10/2014 | Hawkins et al. | |
| 8,865,816 B2 | 10/2014 | Zhang | |
| 8,887,533 B2 | 11/2014 | Johnson et al. | |
| 8,921,244 B2 | 12/2014 | Cabell et al. | |
| 8,951,341 B2 | 2/2015 | Jaffrennou et al. | |
| 8,959,956 B2 | 2/2015 | Mirth et al. | |
| 8,974,686 B2 | 3/2015 | Jaffrennou et al. | |
| 8,980,774 B2 | 3/2015 | Zhang et al. | |
| 9,039,827 B2 | 5/2015 | Hampson | |
| 9,051,494 B2 | 6/2015 | Jaffrennou et al. | |
| 9,133,571 B2 | 9/2015 | Chacko et al. | |
| 9,133,952 B2 | 9/2015 | Lamb et al. | |
| 9,172,074 B2 | 10/2015 | Weber et al. | |
| 9,174,868 B2 | 11/2015 | Jaffrennou et al. | |
| 9,217,065 B2 | 12/2015 | Shoemake et al. | |
| 9,238,749 B2 | 1/2016 | Michl et al. | |
| 9,242,899 B2 | 1/2016 | Castro-Cabado et al. | |
| 9,290,640 B2 | 3/2016 | Hawkins et al. | |
| 9,306,146 B2 | 4/2016 | Thuss | |
| 9,309,436 B2 | 4/2016 | Swift | |
| 9,359,518 B2 | 6/2016 | Kalbe et al. | |
| 9,359,720 B2 | 6/2016 | Chuda et al. | |
| 9,376,810 B2 | 6/2016 | Kemp et al. | |
| 9,382,404 B2 | 7/2016 | Zhang | |
| 9,404,012 B2 | 8/2016 | Connaughton, I et al. | |
| 9,453,140 B2 | 9/2016 | Varagnat et al. | |
| 9,453,294 B2 | 9/2016 | Johnson et al. | |
| 9,486,980 B2 | 11/2016 | Hauber et al. | |
| 9,505,883 B2 | 11/2016 | Appley et al. | |
| PP27,475 P2 | 12/2016 | Kubby | |
| 9,528,261 B2 | 12/2016 | Sandoe et al. | |
| 9,546,263 B2 | 1/2017 | Hawkins et al. | |
| 9,550,894 B2 | 1/2017 | Zhang et al. | |
| 9,609,813 B2 | 4/2017 | Naerum et al. | |
| 9,683,085 B2 | 6/2017 | Zhang et al. | |
| 9,683,143 B2 | 6/2017 | Negri et al. | |
| 9,715,872 B2 | 7/2017 | Guzman et al. | |
| 9,718,729 B2 | 8/2017 | Hernandez-Torres et al. | |
| 9,777,472 B2 | 10/2017 | Wiker et al. | |
| 9,815,928 B2 | 11/2017 | Williamson et al. | |
| 9,822,042 B2 | 11/2017 | Rosenthal et al. | |
| 9,840,061 B2 | 12/2017 | Jaffee | |
| 9,869,089 B2 | 1/2018 | Thomas et al. | |
| 9,896,807 B2 | 2/2018 | Englert et al. | |
| 9,909,310 B2 | 3/2018 | Frank et al. | |
| 9,922,634 B2 | 3/2018 | Thompson, Jr. et al. | |
| 9,926,464 B2 | 3/2018 | Swift et al. | |
| 9,938,712 B2 | 4/2018 | Potter et al. | |
| 9,944,452 B1 | 4/2018 | Mills et al. | |
| 9,945,057 B2 | 4/2018 | Miele et al. | |
| 10,000,666 B2 | 6/2018 | Hawkins et al. | |
| 10,030,177 B2 | 7/2018 | Lochel, Jr. et al. | |
| 10,047,210 B2 | 8/2018 | Hernandez-Torres et al. | |
| 10,119,211 B2 | 11/2018 | Obert et al. | |
| 10,368,502 B2 | 8/2019 | Letton et al. | |
| 10,815,593 B2 | 10/2020 | Guo et al. | |
| 11,111,372 B2 | 9/2021 | Zhang et al. | |
| 11,136,451 B2 | 10/2021 | Zhang et al. | |
| 2003/0060113 A1 | 3/2003 | Christie et al. | |
| 2003/0061777 A1* | 4/2003 | Alderman | B32B 3/20 52/406.1 |
| 2003/0167719 A1* | 9/2003 | Alderman | E04B 1/7666 52/407.3 |
| 2004/0002567 A1 | 1/2004 | Chen et al. | |
| 2004/0038017 A1 | 2/2004 | Tutin et al. | |
| 2004/0180176 A1 | 9/2004 | Rusek, Jr. | |
| 2004/0209074 A1 | 10/2004 | Randall et al. | |
| 2004/0219847 A1 | 11/2004 | Miller | |
| 2004/0254285 A1 | 12/2004 | Rodrigues et al. | |
| 2005/0026527 A1 | 2/2005 | Schmidt et al. | |
| 2005/0032985 A1 | 2/2005 | Chen et al. | |
| 2005/0095937 A1 | 5/2005 | Chen et al. | |
| 2005/0098255 A1 | 5/2005 | Lembo et al. | |
| 2005/0153616 A1 | 7/2005 | Suda et al. | |
| 2005/0166543 A1 | 8/2005 | Suda et al. | |
| 2005/0192390 A1 | 9/2005 | Dobrowolski et al. | |
| 2005/0215153 A1 | 9/2005 | Cossement et al. | |
| 2005/0229518 A1 | 10/2005 | Ruid et al. | |
| 2005/0284065 A1 | 12/2005 | Shaffer | |
| 2005/0288424 A1 | 12/2005 | Fisler et al. | |
| 2006/0036014 A1 | 2/2006 | Hogan et al. | |
| 2006/0078719 A1 | 4/2006 | Miele | |
| 2006/0079629 A1 | 4/2006 | Taylor et al. | |
| 2006/0101796 A1 | 5/2006 | Kern et al. | |
| 2006/0137799 A1 | 6/2006 | Haque et al. | |
| 2006/0168881 A1 | 8/2006 | Straumietis | |
| 2006/0216489 A1 | 9/2006 | Shooshtari et al. | |
| 2006/0217471 A1 | 9/2006 | Shooshtari et al. | |
| 2006/0252855 A1 | 11/2006 | Pisanova et al. | |
| 2006/0257639 A1 | 11/2006 | Bianchi et al. | |
| 2007/0006664 A1 | 1/2007 | Suda et al. | |
| 2007/0010651 A1 | 1/2007 | Finch et al. | |
| 2007/0012414 A1 | 1/2007 | Kajander et al. | |
| 2007/0014995 A1 | 1/2007 | Chacko et al. | |
| 2007/0060005 A1* | 3/2007 | Yang | D04H 1/02 264/109 |
| 2007/0125011 A1 | 6/2007 | Weir et al. | |
| 2007/0270066 A1 | 11/2007 | Van Herwijnen et al. | |
| 2008/0003431 A1 | 1/2008 | Fellinger et al. | |
| 2008/0047548 A1 | 2/2008 | Konietzny et al. | |
| 2008/0138526 A1 | 6/2008 | Tutin et al. | |
| 2008/0152816 A1 | 6/2008 | Clamen et al. | |
| 2008/0176050 A1 | 7/2008 | Lintz et al. | |
| 2008/0248303 A1 | 10/2008 | Maurer | |
| 2009/0004391 A1 | 1/2009 | Olang et al. | |
| 2009/0036011 A1 | 2/2009 | Hunig et al. | |
| 2009/0094923 A1 | 4/2009 | Weir et al. | |
| 2009/0156724 A1 | 6/2009 | Espiard et al. | |
| 2009/0208714 A1 | 8/2009 | Currier et al. | |
| 2009/0324915 A1* | 12/2009 | Swift | C03C 25/325 428/219 |
| 2010/0016143 A1 | 1/2010 | Shooshtari et al. | |
| 2010/0040832 A1 | 2/2010 | Herbert | |
| 2010/0064618 A1 | 3/2010 | Boyd | |
| 2010/0105272 A1 | 4/2010 | Nandi et al. | |
| 2010/0151223 A1 | 6/2010 | Chacko et al. | |
| 2010/0154300 A1 | 6/2010 | Wiersma | |
| 2010/0273006 A1 | 10/2010 | Rodrigues et al. | |
| 2010/0320113 A1 | 12/2010 | Swift | |
| 2011/0003522 A1 | 1/2011 | Chen et al. | |
| 2011/0021101 A1 | 1/2011 | Hawkins et al. | |
| 2011/0028427 A1 | 2/2011 | Mcmanus | |
| 2011/0086226 A1 | 4/2011 | Evans et al. | |
| 2011/0086567 A1 | 4/2011 | Hawkins et al. | |
| 2011/0091710 A1* | 4/2011 | Mirth | D04H 1/4218 428/297.4 |
| 2011/0159768 A1 | 6/2011 | Crescimanno et al. | |
| 2011/0189478 A1 | 8/2011 | Hirano et al. | |
| 2011/0223364 A1 | 9/2011 | Hawkins et al. | |
| 2011/0240910 A1 | 10/2011 | Carr et al. | |
| 2012/0064323 A1 | 3/2012 | Shoemake et al. | |
| 2012/0135659 A1 | 5/2012 | Preininger | |
| 2012/0168054 A1 | 7/2012 | Chen et al. | |
| 2012/0205571 A1 | 8/2012 | Lewis | |
| 2012/0245277 A1 | 9/2012 | Michl et al. | |
| 2012/0251796 A1 | 10/2012 | Potter et al. | |
| 2012/0311744 A1 | 12/2012 | Sirkowski | |
| 2013/0023174 A1 | 1/2013 | Quinn | |
| 2013/0026408 A1 | 1/2013 | Jaffrennou et al. | |
| 2013/0032749 A1 | 2/2013 | Jaffrennou et al. | |
| 2013/0067861 A1 | 3/2013 | Turner et al. | |
| 2013/0082205 A1 | 4/2013 | Mueller et al. | |

(56) References Cited

U.S. PATENT DOCUMENTS

| | | |
|---|---|---|
| 2013/0084445 A1 | 4/2013 | Haley et al. |
| 2013/0157030 A1 | 6/2013 | Frick et al. |
| 2013/0244525 A1 | 9/2013 | Chacko et al. |
| 2013/0327705 A1* | 12/2013 | Clark .................. G10K 11/168 181/294 |
| 2013/0334726 A1 | 12/2013 | Hernandez-Torres et al. |
| 2014/0001395 A1 | 1/2014 | Chen et al. |
| 2014/0038485 A1 | 2/2014 | Anderson et al. |
| 2014/0083328 A1 | 3/2014 | Lochel, Jr. et al. |
| 2014/0099851 A1 | 4/2014 | Haley et al. |
| 2014/0120348 A1 | 5/2014 | Didier et al. |
| 2014/0155353 A1 | 6/2014 | Tezuka et al. |
| 2014/0186635 A1 | 7/2014 | Mueller |
| 2014/0245797 A1 | 9/2014 | Haley et al. |
| 2014/0312260 A2 | 10/2014 | Hampson et al. |
| 2014/0350142 A1 | 11/2014 | Hansen et al. |
| 2015/0010730 A1 | 1/2015 | Faynot et al. |
| 2015/0027052 A1 | 1/2015 | Janssen et al. |
| 2015/0118434 A1 | 4/2015 | Nagarajan et al. |
| 2015/0152244 A1 | 6/2015 | Hernandez-Torres |
| 2015/0192239 A1 | 7/2015 | Lee et al. |
| 2015/0247270 A1 | 9/2015 | Thaxton et al. |
| 2015/0353765 A1 | 12/2015 | Swift et al. |
| 2015/0361653 A1 | 12/2015 | Grant et al. |
| 2015/0373936 A1 | 12/2015 | Bouwens et al. |
| 2016/0088809 A1 | 3/2016 | Lowe et al. |
| 2016/0131299 A1 | 5/2016 | Mueller et al. |
| 2016/0143228 A1 | 5/2016 | De Groot et al. |
| 2016/0145779 A1 | 5/2016 | Teng et al. |
| 2016/0208439 A1 | 7/2016 | Lelogeay |
| 2016/0208483 A1 | 7/2016 | Takeuchi et al. |
| 2016/0219810 A1 | 8/2016 | Erkkil et al. |
| 2016/0264461 A1 | 9/2016 | Peng et al. |
| 2016/0280971 A1 | 9/2016 | Hampson et al. |
| 2016/0297983 A1 | 10/2016 | Saha et al. |
| 2016/0340499 A1 | 11/2016 | Hawkins et al. |
| 2017/0022398 A1 | 1/2017 | Lochel, Jr. et al. |
| 2017/0036955 A1 | 2/2017 | Obert et al. |
| 2017/0037187 A1 | 2/2017 | Appley et al. |
| 2017/0089504 A1 | 3/2017 | Herreman et al. |
| 2017/0150684 A1 | 6/2017 | Vuorinen et al. |
| 2017/0150687 A1 | 6/2017 | Loiske et al. |
| 2017/0174836 A1 | 6/2017 | Hampson et al. |
| 2017/0190902 A1 | 7/2017 | Swift |
| 2017/0197379 A1 | 7/2017 | Teng et al. |
| 2017/0198142 A1 | 7/2017 | Hampson et al. |
| 2017/0198472 A1 | 7/2017 | Evans et al. |
| 2017/0210094 A1 | 7/2017 | Hoshino et al. |
| 2017/0210952 A1 | 7/2017 | Hampson et al. |
| 2017/0305783 A1 | 10/2017 | Faynot et al. |
| 2017/0332568 A1 | 11/2017 | Storey |
| 2017/0349718 A1 | 12/2017 | Albani et al. |
| 2017/0368792 A1 | 12/2017 | Faotto |
| 2018/0023291 A1 | 1/2018 | Wiker et al. |
| 2018/0031268 A1 | 2/2018 | Lopez Belbeze et al. |
| 2018/0037273 A1 | 2/2018 | Aarts et al. |
| 2018/0116131 A1 | 5/2018 | Leo |
| 2018/0139911 A1 | 5/2018 | Janssen |
| 2018/0194937 A1 | 7/2018 | Anderson et al. |
| 2018/0208505 A1 | 7/2018 | Swift et al. |
| 2018/0305589 A1 | 10/2018 | Lochel, Jr. et al. |
| 2018/0312661 A1 | 11/2018 | Hernandez-Torres et al. |
| 2018/0339491 A1 | 11/2018 | Hursit et al. |
| 2019/0062510 A1 | 2/2019 | Castro Cabado et al. |
| 2019/0106563 A1 | 4/2019 | Zhang et al. |
| 2019/0106564 A1 | 4/2019 | Zhang et al. |
| 2019/0124864 A1 | 5/2019 | Bassin et al. |
| 2019/0136527 A1 | 5/2019 | Zheng et al. |
| 2019/0151771 A1 | 5/2019 | Thomas |
| 2019/0191641 A1 | 6/2019 | Jackson et al. |
| 2019/0259108 A1 | 8/2019 | Bongartz et al. |
| 2019/0330492 A1 | 10/2019 | Swift et al. |
| 2019/0359521 A1 | 11/2019 | Salomon et al. |
| 2019/0382536 A1 | 12/2019 | Hwang |
| 2019/0382628 A1 | 12/2019 | Alavi et al. |
| 2020/0095712 A1 | 3/2020 | Mueller et al. |
| 2020/0207972 A1 | 7/2020 | Ong et al. |
| 2021/0095156 A1 | 4/2021 | Swift et al. |
| 2021/0140107 A1 | 5/2021 | Mauret et al. |
| 2021/0170715 A1 | 6/2021 | Grant et al. |
| 2021/0171756 A1 | 6/2021 | Grant et al. |
| 2021/0171757 A1 | 6/2021 | Mueller et al. |
| 2021/0172165 A1 | 6/2021 | Grant et al. |
| 2021/0172166 A1 | 6/2021 | Grant et al. |
| 2021/0172167 A1 | 6/2021 | Grant et al. |
| 2021/0395508 A1 | 12/2021 | Zhang et al. |
| 2022/0064408 A1 | 3/2022 | Zhang et al. |
| 2022/0106419 A1 | 4/2022 | Mueller et al. |
| 2022/0106492 A1 | 4/2022 | Click et al. |
| 2022/0162410 A1 | 5/2022 | Mueller et al. |
| 2022/0213628 A1 | 7/2022 | Smith et al. |
| 2022/0389193 A1 | 12/2022 | Grant et al. |
| 2022/0390059 A1 | 12/2022 | Grant et al. |
| 2022/0411608 A1 | 12/2022 | Tsai et al. |

FOREIGN PATENT DOCUMENTS

| | | | |
|---|---|---|---|
| CA | 2301248 A1 | 9/2000 | |
| CA | 2243736 C * | 4/2002 | ........... B05B 7/0861 |
| CA | 2436506 C | 10/2011 | |
| CA | 2834816 A1 | 11/2012 | |
| CA | 2604809 C | 4/2013 | |
| CN | 1950422 A | 4/2007 | |
| EP | 125397 A1 | 11/1984 | |
| EP | 194242 B1 | 10/1989 | |
| EP | 442811 B2 | 12/1993 | |
| EP | 583086 B1 | 11/1997 | |
| EP | 1022400 A1 | 7/2000 | |
| EP | 715805 B1 | 7/2002 | |
| EP | 1038433 B1 | 6/2008 | |
| EP | 2071066 A1 | 6/2009 | |
| EP | 2093266 A1 | 8/2009 | |
| EP | 2268126 B1 | 4/2012 | |
| EP | 1303672 B1 | 2/2015 | |
| EP | 2690217 B1 | 3/2015 | |
| EP | 2855601 B1 | 9/2016 | |
| EP | 2184391 B1 | 10/2016 | |
| EP | 3034555 B1 | 4/2017 | |
| EP | 2197928 B1 | 5/2017 | |
| EP | 2694717 B1 | 6/2017 | |
| EP | 2844621 B1 | 6/2017 | |
| EP | 1656981 B1 | 1/2018 | |
| EP | 1800853 B1 | 2/2018 | |
| EP | 2755498 B1 | 2/2018 | |
| EP | 2324089 B1 | 3/2018 | |
| EP | 2231543 B1 | 9/2018 | |
| JP | 2017053158 A | 3/2017 | |
| JP | 2017106133 A | 6/2017 | |
| WO | 9204824 A1 | 4/1992 | |
| WO | 9318642 A1 | 9/1993 | |
| WO | 9927206 A1 | 6/1999 | |
| WO | 9961384 A1 | 12/1999 | |
| WO | 0123655 A1 | 4/2001 | |
| WO | 0131131 A1 | 5/2001 | |
| WO | 2004076734 A1 | 9/2004 | |
| WO | 2004098270 A1 | 11/2004 | |
| WO | 2005077184 A1 | 8/2005 | |
| WO | 2006136389 A1 | 12/2006 | |
| WO | 2008009460 A1 | 1/2008 | |
| WO | 2008009462 A1 | 1/2008 | |
| WO | 2008009465 A1 | 1/2008 | |
| WO | 2008091256 A1 | 7/2008 | |
| WO | 2009080822 A1 | 7/2009 | |
| WO | 2011044490 A1 | 4/2011 | |
| WO | 2012118939 A1 | 9/2012 | |
| WO | 2013021234 A1 | 2/2013 | |
| WO | 2015144843 A1 | 10/2015 | |
| WO | 2016025987 A2 | 2/2016 | |
| WO | 2017074853 A1 | 5/2017 | |
| WO | 2017084853 A1 | 5/2017 | |
| WO | 2017157525 A1 | 9/2017 | |
| WO | 2017211642 A1 | 12/2017 | |
| WO | 2018010558 A1 | 1/2018 | |
| WO | 2018130648 A1 | 7/2018 | |

(56) References Cited

FOREIGN PATENT DOCUMENTS

| WO | 2018158677 | A1 | 9/2018 |
| WO | 2019050439 | A2 | 3/2019 |
| WO | 2019074865 | A1 | 4/2019 |
| WO | 2019074867 | A1 | 4/2019 |
| WO | 2019221863 | A1 | 11/2019 |
| WO | 2019231994 | A1 | 12/2019 |
| WO | 2020144436 | A1 | 7/2020 |
| WO | 2020210191 | A1 | 10/2020 |
| WO | 2021118951 | A1 | 6/2021 |
| WO | 2022051213 | A1 | 3/2022 |

OTHER PUBLICATIONS

International Search Report and Written Opinion from PCT/US20/63699 dated Mar. 10, 2021.
International Search Report and Written Opinion from PCT/US20/63716 dated Mar. 8, 2021.
"Curing (chemistry)" (Wikipedia) [retrieved on Jul. 22, 2022] Retrieved from the internet <URL:https://en.wikipedia.org/wiki/Curing_(chemistry).
Langlais et al., "Influence of the Chemical Composition of Glass on Heat Transfer through Glass Fibre Inuslations in Relation to Their Morphology and Temperature of Use," J. Thermal Insul. And Bldg. Envs., Volue 18, Apr. 1995, pp. 350-376.
"R-Value and Densities Chart" (PLTW Engineering) 2010 [retrieved on Jan. 28, 2021] Retrieved from the internet <URL: https://www.windsor-csd.org/Downloads/R-ValueDensitiesChart2.pdf>.
Wikipedia, "Triose," retrieved from <https://en.wikipedia.org/wiki/Triose> on Oct. 29, 2021.
Lee et al., "A Review on Citric Acid as Green Modifying Agent and Binder for Wood," Polymers, 2020; 12(8):1692, 21 pages.
Office Action from U.S. Appl. No. 17/114,625 dated Feb. 13, 2023.
Notice of Allowance from U.S. Appl. No. 17/114,625 dated Apr. 20, 2023.
Notice of Allowance from U.S. Appl. No. 17/114,625 dated Jul. 27, 2023.

* cited by examiner

FIBERGLASS INSULATION PRODUCT

CROSS-REFERENCE TO RELATED APPLICATIONS

This application is a continuation of U.S. Non-Provisional Application Ser. No. 17/114,625, filed on Dec. 8, 2020, which claims priority to and the benefit of U.S. Provisional Application No. 62/945,334, filed Dec. 9, 2019, the entire contents of which are incorporated by reference herein.

FIELD

The present application generally relates to fiberglass insulation products.

BACKGROUND

The term "fibrous insulation product" is general and encompasses a variety of compositions, articles of manufacture, and manufacturing processes. Mineral fibers (e.g., glass fibers) are commonly used in insulation products and nonwoven mats. Fibrous insulation is typically manufactured by fiberizing a molten composition of polymer, glass, or other mineral and spinning fibers from a fiberizing apparatus, such as a rotating spinner. To form an insulation product, fibers produced by the rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers.

The blanket containing the binder-coated fibers is then passed through a curing oven and the binder is cured to set the blanket to a desired thickness. After the binder has cured, the fiber insulation may be cut into lengths to form individual insulation products, and the insulation products may be packaged for shipping to customer locations. One typical insulation product produced is an insulation batt or blanket, which is suitable for use as wall insulation in residential dwellings or as insulation in the attic and floor insulation cavities in buildings. Another common insulation product is air-blown or loose-fill insulation, which is suitable for use as sidewall and attic insulation in residential and commercial buildings as well as in any hard-to-reach locations. Loose-fill insulation can be formed of small cubes that are cut from insulation blankets, compressed, and packaged in bags.

Fibrous insulation products may be characterized by many different properties, such as for example, density. Low density flexible insulation batts and blankets typically have densities between 0.4 pounds/cubic foot ("pcf") and 2.0 pcf, and are often used for residential insulation in walls, attics, and basements. Fibrous insulation products also include higher density products having densities from 7 pcf to 10 pcf, such as boards and panels or formed products. Higher density insulation products are often used in industrial and/or commercial applications, including but not limited to metal building wall and ceiling insulation, pipe or tank insulation, insulative ceiling and wall panels, duct boards, etc.

SUMMARY

One aspect of the present disclosure is directed to a fibrous insulation product having a plurality of randomly oriented glass fibers and a binder composition that holds the glass fibers together. The fibrous insulation product has an R-value in the range of 10 to 54 and, after curing, has a density, when uncompressed, in the range of 0.30 pcf to 2.7 pcf. Furthermore, the fibrous insulation product includes glass fibers that, prior to the application of the binder composition, have an average fiber diameter in the range of 15 hundred thousandths of an inch (HT) to 19 HT and a quantity of binder that is in the range of 2% to 10% by weight of the fibrous insulation product. The fibrous insulation product also has an average fiber diameter to density ratio (Fd/D) of less than or equal to 40 and a comfort factor less than or equal to 3.417(Fd/D)+60.

Another aspect of the present disclosure is directed to a building frame having a plurality of parallel, spaced apart framing members and a fiberglass insulation batt received between two of the plurality of framing members. The fiberglass batt having a plurality of randomly oriented glass fibers and a binder composition that holds the glass fibers together. The fibrous insulation batt has an R-value in the range of 10 to 54 and, after curing, has a density, when uncompressed, in the range of 0.30 pcf to 2.7 pcf. Furthermore, the fibrous insulation batt includes glass fibers that, prior to the application of the binder composition, have an average fiber diameter in the range of 15 HT to 19 HT and a quantity of binder that is in the range of 2% to 10% by weight of the fibrous insulation product. The fibrous insulation batt also has an average fiber diameter to density ratio (Fd/D) of less than or equal to 40 and a comfort factor less than or equal to 3.417(Fd/D)+60.

BRIEF DESCRIPTION OF THE DRAWINGS

Features and advantages of the present invention will become apparent to those of ordinary skill in the art to which the invention pertains from a reading of the following description together with the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All numerical ranges are understood to include all possible incremental sub-ranges within the outer boundaries of the range. Thus, for example, a density range of 0.3 pcf to 2.0 pcf discloses, for example, 0.5 pcf to 1.2 pcf, 0.7 pcf to 1.0 pcf, etc.

Figure 1:
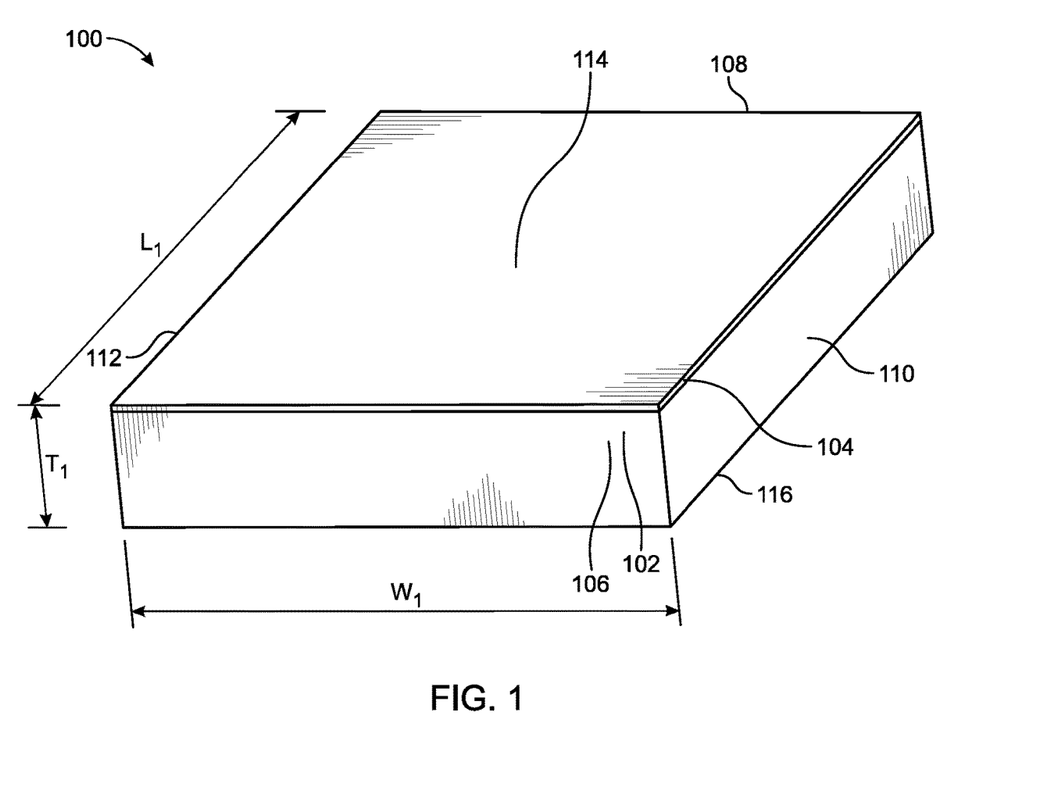
FIG. 1 is a perspective view of an exemplary embodiment of a fibrous insulation product.

FIG. 1 illustrates an exemplary embodiment of a fibrous insulation product 100. The fibrous insulation product 100 may be configured in a variety of ways. Fibrous insulation products are generally formed of matted inorganic fibers bonded together by a binder composition. Examples of suitable inorganic fibers include glass fibers, wool glass fibers, ceramic fibers, stone, slag, and basalt. Optionally, other reinforcing fibers such as natural fibers and/or synthetic fibers such as polyester, polyethylene, polyethylene terephthalate, polypropylene, polyamide, aramid, and/or polyaramid fibers may be present in the insulation product in addition to the glass fibers. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include cotton, jute, bamboo, ramie, bagasse, hemp, coir, linen, kenaf, sisal, flax, henequen, and combinations thereof. Fibrous insulation products may be formed entirely of one type of fiber, or they may be formed of a combination of different types of fibers. For example, the fibrous insulation product may be formed of combinations of various types of glass fibers or various combinations of different inorganic fibers and/or natural fibers depending on the desired application for the insulation. The embodiments described herein are with reference to insulation products formed entirely of glass fibers.

In the illustrated embodiment, the fibrous insulation product 100 is a generally box-shaped fiberglass insulation batt. In other embodiments, however, the insulation product can be any suitable shape or size, such as for example, a rolled product or a blanket. As an insulation batt or blanket, the fibrous insulation product 100 may be placed in the insulation cavities of buildings. For example, the fibrous insulation product 100 may be placed in the space or cavity between two parallel, spaced apart framing members in a wall, roof, or floor frame of a building.

The fibrous insulation product 100 includes an insulation layer 102 comprising nonwoven glass fibers and a binder to adhere the glass fibers together. Optionally, the fibrous insulation product 100 may also include a facing 104 attached or otherwise adhered to the insulation layer 102. The fibrous insulation product 100 includes a first side surface 106, a second side surface 108 spaced apart from and opposite the first side surface 106, a third side surface 110 extending between the first side surface 106 and the second side surface 108, and a fourth side surface 112 spaced apart from and opposite the third side surface 110 and extending between the first side surface 106 and the second side surface 108. The fibrous insulation product 100 also includes a first face 114 connecting the side surfaces 106, 108, 110, 112 and a second face 116 parallel to, or generally parallel to, and opposite the first face 114 and connecting the side surfaces 106, 108, 110, 112. The fibrous insulation product 100, when uncompressed, has a length $L_1$, a width $W_1$, and a thickness $T_1$. In some embodiments, the length $L_1$ is greater than the width $W_1$ which is greater than the thickness $T_1$.

The facing 104 may be disposed on the insulation layer 102 to form the entirety of, or a portion of, the first face 114, the second face 116, or both faces of the fibrous insulation product 100. The facing 104 may take a wide variety of different forms. The facing 104 can be a single piece or multiple different pieces or sheets of material and may include a single layer or several layers of material. In the exemplary embodiment of FIG. 1, the facing 104 is a single piece of material that connects the side surfaces 106, 108, 110, 112.

The facing 104 may be made from a variety of different materials. Any material suitable for use with a fibrous insulation product may be used. For example, the facing 104 may comprise nonwoven fiberglass and polymeric media; woven fiberglass and polymeric media; sheathing materials, such as sheathing films made from polymeric materials; scrim; cloth; fabric; fiberglass reinforced kraft paper (FRK); a foil-scrim-kraft paper laminate; recycled paper; and calendared paper.

A significant amount of the insulation placed in the insulation cavities of buildings is in the form of insulation blankets rolled from insulation products such as those described herein. Faced insulation products are installed with the facing 104 placed flat on the edge of the insulation cavity, typically on the interior side of the insulation cavity. Insulation products where the facing is a vapor retarder are commonly used to insulate wall, floor, or ceiling cavities that separate a warm interior space from a cold exterior space. The vapor retarder is placed on one side of the insulation product to retard or prohibit the movement of water vapor through the insulation product.

Figure 2:
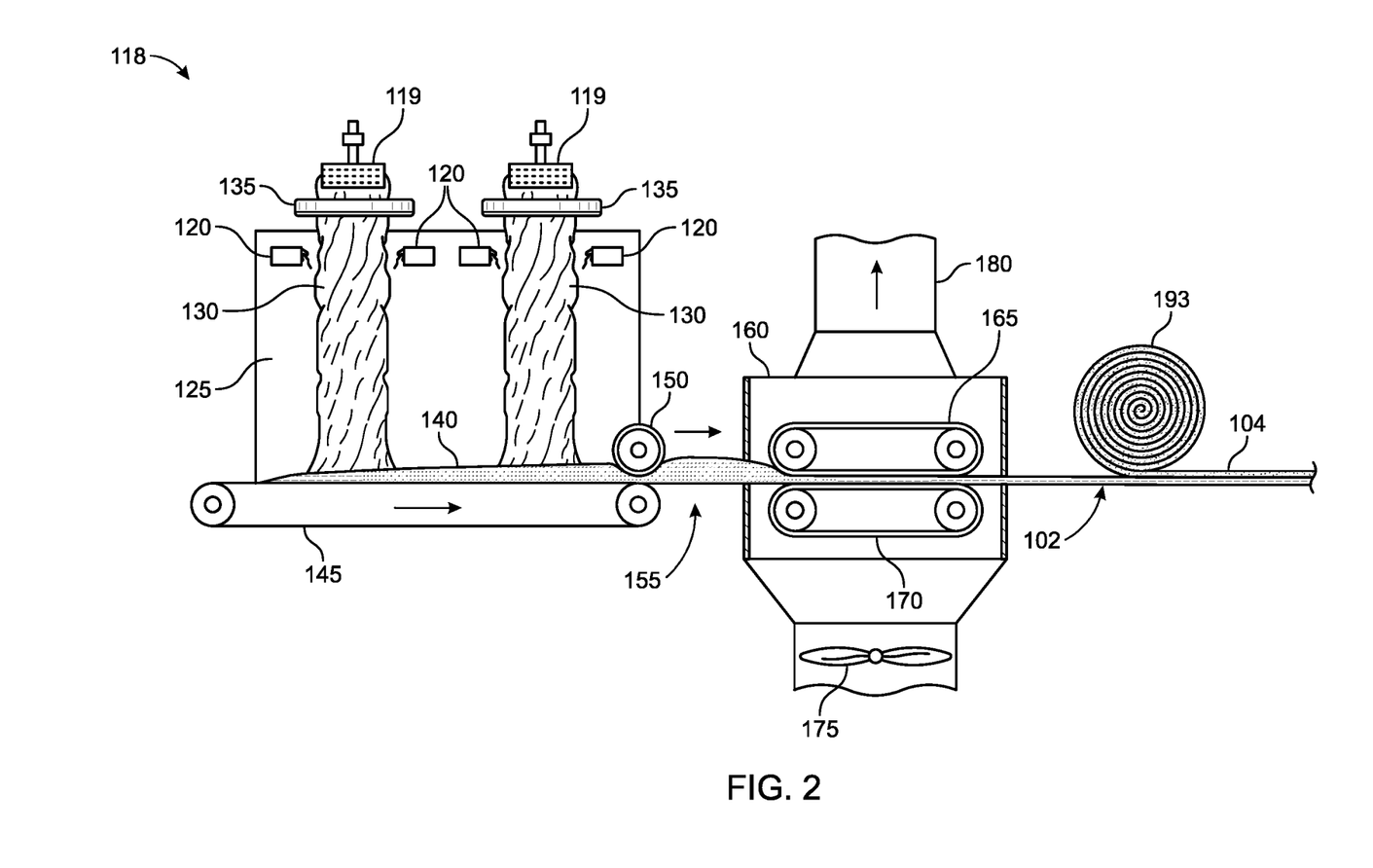
FIG. 2 is an elevational view of an exemplary embodiment of a manufacturing line for producing the fibrous insulation product of FIG. 1.

FIG. 2 illustrates an exemplary embodiment of an apparatus 118 for manufacturing the fibrous insulation product 100. The manufacture of the fibrous insulation product 100 may be carried out in a continuous process by fiberizing molten glass, coating the molten glass fibers with a binder, forming a fibrous glass pack on a moving conveyor, and curing the binder to form an insulation blanket as depicted in FIG. 2. Glass may be melted in a tank (not shown) and supplied to a fiber forming device, such as one or more fiberizing spinners 119. Although spinners 119 are shown as the fiber forming device in the exemplary embodiment, it will be understood that other types of fiber forming units may be used to form the fibrous insulation product 100. The spinners 119 are rotated at high speeds. Centrifugal force causes the molten glass to pass through small orifices in the circumferential sidewalls of the fiberizing spinners 119 to form glass fibers. Glass fibers 130 of random lengths may be attenuated from the fiberizing spinners 119 and blown generally downwardly (i.e., generally perpendicular to the plane of the spinners 119) by blowers 120 positioned within a forming chamber 125.

The blowers 120 turn the glass fibers 130 downward. The glass fibers 130, while in transit downward in the forming chamber 125 and while still hot from the drawing operation, are sprayed with an aqueous binder composition by an annular spray ring 135 so as to result in a relatively even distribution of the binder composition throughout the glass fibers 130. Water may also be applied to the glass fibers 130 in the forming chamber 125, such as by spraying, prior to the application of the binder composition to at least partially cool the glass fibers 130.

The glass fibers 130 having the uncured resinous binder composition adhered thereto may be gathered and formed into a fibrous pack 140 on an endless forming conveyor 145 within the forming chamber 125 with the aid of a vacuum (not shown) drawn through the fibrous pack 140 from below the forming conveyor 145. The residual heat from the glass fibers 130 and the flow of air through the fibrous pack 140 during the forming operation are generally sufficient to volatilize a majority of the water from the binder before the glass fibers 130 exit the forming chamber 125, thereby leaving the remaining components of the binder composition on the glass fibers 130 as a viscous or semi-viscous high-solids liquid.

The resin-coated fibrous pack 140, which is in a compressed state due to the flow of air through the fibrous pack 140 in the forming chamber 125, is then transferred out of the forming chamber 125 under exit roller 150 to a transfer zone 155 where the fibrous pack 140 vertically expands due to the resiliency of the glass fibers 130. The expanded fibrous pack 140 is then heated, such as by conveying the fibrous pack 140 through a curing oven 160 where heated air is blown through the fibrous pack 140 to evaporate any remaining water in the binder composition, cure the binder composition, and rigidly bond the glass fibers 130 together. The curing oven 160 includes a foraminous upper oven conveyor 165 and a foraminous lower oven conveyor 170, between which the fibrous pack 140 is drawn. Heated air is forced through the lower oven conveyor 170, the fibrous pack 140, and the upper oven conveyor 165 by a fan 175. The heated air exits the curing oven 160 through an exhaust apparatus 180.

Also, in the curing oven 160, the fibrous pack 140 may be compressed by the upper and lower foraminous oven conveyors 165, 170 to form the insulation layer 102 of the fibrous insulation product 100. The upper and lower oven conveyors 165, 170 may be used to compress the fibrous pack 140 to give the insulation layer 102 its predetermined thickness $T_1$. It is to be appreciated that although FIG. 2 depicts the conveyors 165, 170 as being in a substantially parallel orientation, they may alternatively be positioned at an angle relative to each other (not illustrated).

The cured binder composition imparts strength and resiliency to the insulation layer 102. It is to be appreciated that the drying and curing of the binder composition may be carried out in either one or two different steps. The two stage (two-step) process is commonly known as B-staging. The curing oven 160 may be operated at a temperature from 100° C. to 325° C., or from 250° C. to 300° C. The fibrous pack 140 may remain within the curing oven 160 for a period of time sufficient to crosslink (cure) the binder composition and form the insulation layer 102.

Once the insulation layer 102 exits the curing oven 160, a facing material 193 may be placed on the insulation layer 102 to form the facing layer 104. The facing material 193 may be adhered to the first face 114, to the second face 116, or both faces of the insulation layer 102 by a bonding agent (not shown) or some other means (e.g., stitching, mechanical entanglement) to form the fibrous insulation product 100. Suitable bonding agents include adhesives, polymeric resins, asphalt, and bituminous materials that can be coated or otherwise applied to the facing material 193. The fibrous insulation product 100 may subsequently be rolled for storage and/or shipment or cut into predetermined lengths by a cutting device (not illustrated). It is to be appreciated that, in some exemplary embodiments, the insulation layer 102 that emerges from the curing oven 160 is rolled onto a take-up roll or cut into sections having a desired length and is not faced with a facing material 193.

In the context of the fibrous insulation product 100, a "binder composition" refers to organic agents or chemicals, often polymeric resins, used to adhere the glass fibers 130 to one another in a three-dimensional structure. The binder composition may be in any form, such as a solution, an emulsion, or dispersion. "Binder dispersions" or "binder emulsions" thus refer to mixtures of binder chemicals in a medium or vehicle. As used herein, the terms "binder composition," "aqueous binder composition," "binder formulation," "binder," and "binder system" may be used interchangeably and are synonymous. Additionally, as used herein, the terms "formaldehyde-free" or "no added formaldehyde" may be used interchangeably and are synonymous.

A wide variety of binder compositions may be used with the glass fibers of the present invention. For example, binder compositions fall into two broad, mutually exclusive classes: thermoplastic and thermosetting. Both thermoplastic and thermosetting binder compositions may be used with the invention. A thermoplastic material may be repeatedly heated to a softened or molten state and will return to its former state upon cooling. In other words, heating may cause a reversible change in the physical state of a thermoplastic material (e.g. from solid to liquid) but it does not undergo any irreversible chemical reaction. Exemplary thermoplastic polymers suitable for use in the fibrous insulation product 100 include, but are not limited to, polyvinyls, polyethylene terephthalate (PET), polypropylene or polyphenylene sulfide (PPS), nylon, polycarbonates, polystyrene, polyamides, polyolefins, and certain copolymers of polyacrylates.

In contrast, the term thermosetting polymer refers to a range of systems which exist initially as liquids but which, on heating, undergo a reaction to form a solid, highly crosslinked matrix. Thus, thermosetting compounds comprise reactant systems—often pairs of reactants—that irreversibly crosslink upon heating. When cooled, they do not regain their former liquid state but remain irreversibly crosslinked.

The reactants useful as thermosetting compounds generally have one or more of several reactive functional groups: e.g. amine, amide, carboxyl or hydroxyl. As used herein, "thermoset compound" (and its derivative clauses like "thermosetting compound," "thermosetting binder" or "thermoset binder") refers to at least one of such reactants, it being understood that two or more may be necessary to form the crosslinking system characteristic of thermosetting compounds. In addition to the principle reactants of the thermosetting compounds, there may be catalysts, process aids, and other additives.

Phenolic/formaldehyde binder compositions are a known thermosetting binder system. The present invention encompasses both traditional phenolic-formaldehyde binder compositions, as well as the more recent formaldehyde-free binder compositions. Formaldehyde-free, thermosetting binder systems may include carboxylic acid (such as, for example, polyacrylic acid) and polyol polymers. An example is the polyacrylic acid/polyol/polyacid binder system described in U.S. Pat. Nos. 6,884,849 and 6,699,945 to Chen et al., the entire contents of which are each expressly incorporated herein by reference. A second category of formaldehyde-free, thermosetting binder compositions are referred to as "bio-based" or "natural" binders. "Bio-based binder" and "natural binder" are used interchangeably herein to refer to binder compositions made from nutrient compounds, such as carbohydrates, proteins, or fats, which have much reactive functionality. Because they are made from nutrient compounds, they are environmentally friendly. Bio-based binder compositions are described in more detail in U.S. Pat. Publication No. 2011/0086567 to Hawkins et al., filed Oct. 8, 2010, the entire contents of which are expressly incorporated herein by reference. In some exemplary embodiments, the binder includes Owens-Corning's EcoTouch™ binder or EcoPure™ binder, Owens Corning's Sustaina™ binder, or Knauf's ECOSE® binder.

Alternative reactants useful as thermosetting compounds are triammonium citrate-dextrose systems derived from mixing dextrose monohydrate, anhydrous citric acid, water and aqueous ammonia. Additionally, carbohydrate reactants and polyamine reactants are useful thermosetting compounds, wherein such thermosetting compounds are described in more detail in U.S. Pat. Nos. 8,114,210, 9,505,883 and 9,926,464, the disclosures of which are hereby incorporated by reference.

In one exemplary embodiment, the fibrous insulation product 100 includes a binder composition including maltodextrin, citric acid, sodium hypophosphite, and vegetable oil. For example, two exemplary embodiments of a binder composition having maltodextrin, citric acid, sodium hypophosphite and vegetable oil are listed in Table 1 below:

TABLE 1

Binder Composition Example 1

| Component | Formulation Embodiment A (wt. % solids) |
|---|---|
| Maltodextrin | 50-80% |
| Citric Acid | 20-50% |
| Sodium Hypophosphite | 0.5-10% |
| Nonionic Surfactant | 0-2% |
| Vegetable Oil Blend | 1-20% |
| Amino Silane | 0.05-0.18% |
| Pink Dye | 0-5% |

In another exemplary embodiment, the fibrous insulation product 100 includes a formaldehyde-free aqueous binder composition comprising at least one long-chain polyol, and at least one primary cross-linking agent, and at least one secondary cross-linking agent comprising at least one short-chain polyol.

The long-chain polyol may comprise a polyol having at least two hydroxyl groups having a number average molecular weight of at least 2,000 Daltons, such as a molecular weight between 3,000 Daltons and 4,000 Daltons. In some exemplary embodiments, the long-chain polyol comprises one or more of a polymeric polyhydroxy compound, such as a polyvinyl alcohol, polyvinyl acetate, which may be partially or fully hydrolyzed, or mixtures thereof. Illustratively, when a partially hydrolyzed polyvinyl acetate serves as the polyhydroxy component, an 80%-89% hydrolyzed polyvinyl acetate may be utilized, such as, for example Poval® 385 (Kuraray America, Inc.) and Sevol™ 502 (Sekisui Specialty Chemicals America, LLC), both of which are about 85% (Poval® 385) and 88% (Selvol™ 502) hydrolyzed.

The long-chain polyol may be present in the aqueous binder composition in an amount up to about 30% by weight total solids, including without limitation, up to about 28%, 25%, 20%, 18%, 15%, and 13% by weight total solids. In any of the exemplary embodiments, the long-chain polyol is present may be present in the aqueous binder composition in an amount from 2.5% to 30% by weight total solids, including without limitation 5% to 25%, 8% to 20%, 9% to 18%, and 10% to 16%, by weight total solids.

The primary crosslinking agent may be any compound suitable for crosslinking a polyol. In any of the exemplary embodiments, the primary crosslinking agent may have a number average molecular weight greater than 90 Daltons, from about 90 Daltons to about 10,000 Daltons, or from about 190 Daltons to about 5,000 Daltons. In any of the exemplary embodiments, the crosslinking agent may have a number average molecular weight of about 2,000 Daltons to 5,000 Daltons, or about 4,000 Daltons. Non-limiting examples of suitable crosslinking agents include materials having one or more carboxylic acid groups (—COOH), such as polycarboxylic acids (and salts thereof), anhydrides, monomeric and polymeric polycarboxylic acid with anhydride (i.e., mixed anhydrides), and homopolymer or copolymer of acrylic acid, such as polyacrylic acid (and salts thereof) and polyacrylic acid based resins such as QR-1629S and Acumer 9932, both commercially available from The Dow Chemical Company. Acumer 9932 is a polyacrylic acid/sodium hypophosphite resin having a molecular weight of about 4000 and a sodium hypophosphite content of 6-7% by weight. QR-1629S is a polyacrylic acid/glycerin mixture.

The primary cross-linking agent may, in some instances, be pre-neutralized with a neutralization agent. Such neutralization agents may include organic and/or inorganic bases, such sodium hydroxide, ammonium hydroxide, and diethylamine, and any kind of primary, secondary, or tertiary amine (including alkanol amine). In various exemplary embodiments, the neutralization agents may include at least one of sodium hydroxide and triethanolamine.

In some exemplary embodiments, the primary crosslinking agent is present in the aqueous binder composition in at least 50 wt. %, based on the total solids content of the aqueous binder composition, including, without limitation at least 55 wt. %, at least 60 wt. %, at least 63 wt. %, at least 65 wt. %, at least 70 wt. %, at least 73 wt. %, at least 75 wt. %, at least 78 wt. %, and at least 80 wt. %. In some exemplary embodiments, the primary crosslinking agent is present in the aqueous binder composition in an amount from 50% to 85% by weight, based on the total solids content of the aqueous binder composition, including without limitation 60% to 80% by weight, 62% to 78% by weight, and 65% to 75% by weight.

The aqueous binder composition may further include a short-chain polyol. The short-chain polyol may comprise a water-soluble compound having a molecular weight of less than 2,000 Daltons, including less than 750 Daltons, less than 500 Daltons and having a plurality of hydroxyl (—OH) groups. Suitable short-chain polyol components include sugar alcohols, pentaerythritol, primary alcohols, 2,2-bis (methylol)propionic acid, tri(methylol)propane (TMP), 1,2, 4-butanetriol, trimethylolpropane, and short-chain alkanolamines, such as triethanolamine, comprising at least three hydroxyl groups. In any of the embodiments disclosed herein, the polyol may comprise at least 4 hydroxyl groups, or at least five hydroxyl groups.

In some exemplary embodiments, the short-chain polyol serves as a viscosity reducing agent, which breaks down the intra and inter molecular hydrogen bonds between the long-chain polyol molecules (e.g., polyvinyl alcohol) and thus lowers the viscosity of the composition. However, as these small-chain polyol molecules have similar structures to the long-chain polyols, they can react similarly with cross-linking agents, thus they do not negatively impact the binder and product performance.

Sugar alcohol is understood to mean compounds obtained when the aldo or keto groups of a sugar are reduced (e.g. by hydrogenation) to the corresponding hydroxy groups. The starting sugar might be chosen from monosaccharides, oligosaccharides, and polysaccharides, and mixtures of those products, such as syrups, molasses and starch hydrolyzates. The starting sugar also could be a dehydrated form of a sugar. Although sugar alcohols closely resemble the corresponding starting sugars, they are not sugars. Thus, for instance, sugar alcohols have no reducing ability, and cannot participate in the Maillard reaction typical of reducing sugars. In some exemplary embodiments, the sugar alcohol includes glycerol, erythritol, arabitol, xylitol, sorbitol, maltitol, mannitol, iditol, isomaltitol, lactitol, cellobitol, palatinitol, maltotritol, syrups thereof and mixtures thereof. In various exemplary embodiments, the sugar alcohol is selected from glycerol, sorbitol, xylitol, and mixtures thereof. In some exemplary embodiments, the secondary cross-linking agent is a dimeric or oligomeric condensation product of a sugar alcohol. In various exemplary embodiments, the condensation product of a sugar alcohol is isosorbide. In some exemplary embodiments, the sugar alcohol is a diol or glycol.

In some exemplary embodiments, the short-chain polyol is present in the aqueous binder composition in an amount up to about 30% by weight total solids, including without limitation, up to about 25%, 20%, 18%, 15%, 13%, 11%, and 10% by weight total solids. In some exemplary embodiments, the short-chain polyol is present in the aqueous binder composition in an amount from 0 to 30% by weight total solids, including without limitation 2% to 30%, 3% to %, 5% to 20%, 8% to 18%, and 9% to 15%, by weight total solids.

In various exemplary embodiments, the long-chain polyol, crosslinking agent, and small-chain polyol are present in amounts such that the ratio of the number of molar equivalents of carboxylic acid groups, anhydride groups, or salts thereof to the number of molar equivalents of hydroxyl groups is from about 1/0.05 to about 1/5, such as from about 1/0.08 to about 1/2.0, from about 1/0.1 to about 1/1.5, and from about 1/0.3 to about 1/0.66. It has surprisingly been discovered, however, that within this ratio, the ratio of long-chain polyol to short-chain polyol effects the performance of the binder composition, such as the tensile strength and water solubility of the binder after cure. For instance, it has been discovered that a ratio of long-chain polyol to short-chain polyol between about 0.1/0.9 to about 0.9/0.1, such as between about and 0.7/0.3, or between about 0.4/0.6 and 0.6/0.4 provides a balance of desirable mechanical properties and physical color properties. In various exemplary embodiments, the ratio of long-chain polyol to short-chain polyol is approximately 0.5/0.5. The ratio of long-chain polyol to short-chain polyol may be optimized such that particular properties are optimized, depending on the needs of an end-use application.

In some exemplary embodiments, polyacrylic acid, polyvinyl alcohol, sorbitol, and sodium hypophosphite. For example, an exemplary embodiment of a binder composition including polyacrylic acid, polyvinyl alcohol, sorbitol, and sodium hypophosphite is listed in Table 2 below:

TABLE 2

Binder Composition Example 2

| Component | Formulation Embodiment B (wt. % solids) |
|---|---|
| Polyacrylic Acid | 60-80% |
| Polyvinyl alcohol "PVOH" | 2.5-30% |
| Sorbitol | 8-30% |
| Sodium Hypophosphite | 2-10% |
| Silane Coupling Agent | 0.1-3% |
| Surfactant (Surfynol, nonionic surfactant, anti-foam, acetylenic diol) | 0.1-1.0% |

In another exemplary embodiment, the fibrous insulation product 100 includes a formaldehyde-free aqueous binder composition comprising at least one primary cross-linking agent and at least one short-chain polyol, as described above, but without further comprising a long-chain polyol.

In such aqueous binder compositions, the cross-linking agent is present in the aqueous binder composition in at least 30.0% by weight, based on the total solids content of the aqueous binder composition, including, without limitation at least 40% by weight, at least 45% by weight, at least 50% by weight, at least 52.0% by weight, at least 54.0% by weight, at least 56.0% by weight, at least 58.0% by weight, and at least 60.0% by weight. In any of embodiments disclosed herein, the cross-linking agent may be present in the aqueous binder composition in an amount from 30% to 85% by weight, based on the total solids content of the aqueous binder composition, including without limitation 50.0% to 70.0% by weight, greater than 50% by weight to 65% by weight, 52.0% to 62.0% by weight, 54.0% to 60.0% by weight, and 55.0% to 59.0% by weight.

The polyol is present in the aqueous binder composition in an amount up to about 70% by weight total solids, including without limitation, up to about 60%, 55%, 50%, 40%, 35%, 33%, 30%, 27%, 25%, and 20% by weight total solids. In some exemplary embodiments, the polyol is present in the aqueous binder composition in an amount from 2.0% to 65.0% by weight total solids, including without limitation 5.0% to 40.0%, 8.0% to 37.0%, 10.0% to 34.0%, 12.0% to 32.0%, 15.0% to 30.0%, and 20.0% to 28.0%, by weight total solids.

In various exemplary embodiments, the cross-linking agent and polyol are present in amounts such that the ratio of the number of molar equivalents of carboxylic acid groups, anhydride groups, or salts thereof to the number of molar equivalents of hydroxyl groups is from about 0.6/1 to about 1/0.6, such as from about 0.8/1 to about 1/0.8, or from about 0.9/1 to about 1/0.9.

In any of the embodiments disclosed herein, the aqueous binder composition may be free or substantially free of polyols comprising less than 3 hydroxyl groups, or free or substantially free of polyols comprising less than 4 hydroxyl groups. In any of the embodiments disclosed herein, the aqueous binder composition is free or substantially free of polyols having a number average molecular weight of 2,000 Daltons or above, such as a molecular weight between 3,000 Daltons and 4,000 Daltons. Accordingly, in any of the embodiments disclosed herein, the aqueous binder composition is free or substantially free of diols, such as glycols; triols, such as, for example, glycerol and triethanolamine; and/or polymeric polyhydroxy compounds, such as polyvinyl alcohol, polyvinyl acetate, which may be partially or fully hydrolyzed, or mixtures thereof. Polyvinyl alcohol is a known film former, which causes moisture to release quickly, leading to the formation of a film.

In any of the embodiments disclosed herein, the aqueous binder compositions may comprise or consist of a polymeric polycarboxylic acid-based cross-linking agent and a monomeric polyol having at least four hydroxyl groups with a ratio of carboxylic acid groups to hydroxyl groups OH groups between 0.60/1 to 1/0.6.

TABLE 3

Binder Composition Example 3

| Component | Exemplary Range 1 (% By Weight of Total Solids) | Exemplary Range 2 (% By Weight of Total Solids) |
|---|---|---|
| Polycarboxylic acid | 30-85 | 55-65 |
| Polyol | 15-70 | 20-35 |
| Catalyst | 0.5-5.0 | 2.0-3.5 |
| Coupling agent | 0-2.0 | 0.12-0.5 |
| Oil Emulsion | 2-15 | 8-13 |
| Surfactant | 0-5.0 | 0.1-1.0 |
| Pigment | 0-2 | 0.1-1.0 |
| Silicone | 0-15 | 0.5-10.0 |

In any of the aqueous binder compositions disclosed herein, all or a percentage of the acid functionality in the polycarboxylic acid may be temporarily blocked with the use of a protective agent, which temporarily blocks the acid functionality from complexing with the mineral wool fibers, and is subsequently removed by heating the binder composition to a temperature of at least 150° C., freeing the acid functionalities to crosslink with the polyol component and complete the esterification process, during the curing process. In any of the exemplary embodiments, 10% to 100% of the carboxylic acid functional groups may be temporarily blocked by the protective agent, including between about 25% to about 99%, about 30% to about 90%, and about 40% to 85%, including all subranges and combinations of ranges therebetween. In any of the exemplary embodiments, a minimum of 40% of the acid functional groups may be temporarily blocked by the protective agent.

The protective agent may be capable of reversibly bonding to the carboxylic acid groups of the crosslinking agent. In any of the exemplary embodiments, the protective agent comprises any compound comprising molecules capable of forming at least one reversible ionic bond with a single acid functional group. In any of the exemplary embodiments disclosed herein, the protective agent may comprise a nitrogen-based protective agent, such as an ammonium-based protective agent; an amine-based protective agent; or mixtures thereof. An exemplary ammonium based protective agent includes ammonium hydroxide. Exemplary amine-based protective agents include alkylamines and diamines, such as, for example ethyleneimine, ethylenediamine, hexamethylenediamine; alkanolamines, such as: ethanolamine, diethanolamine, triethanolamine; ethylenediamine-N,N'-disuccinic acid (EDDS), ethylenediaminetetraacetic acid (EDTA), and the like, or mixtures thereof. In addition, the alkanolamine can be used as both a protecting agent and as a participant in the crosslinking reaction to form ester in the cured binder. Thus, the alkanolamine has a dual-functionality of protective agent and polyol for crosslinking with the polycarboxylic acid via esterification.

The protective agent functions differently than a conventional pH adjuster. A protective agent, as defined herein, only temporarily and reversibly blocks the acid functional groups in the polymeric polycarboxylic acid component. In contrast, conventional pH adjusters, such as sodium hydroxide, permanently terminate an acid functional group, which prevents crosslinking between the acid and hydroxyl groups due to the blocked acid functional groups. Thus, the inclusion of traditional pH adjusters, such as sodium hydroxide, does not provide the desired effect of temporarily blocking the acid functional groups, while later freeing up those functional groups during to cure to permit crosslinking via esterification. Accordingly, in any of the exemplary embodiments disclosed herein, the binder composition may be free or substantially free of conventional pH adjusters, such as, for example, sodium hydroxide and potassium hydroxide. Such conventional pH adjusters for high temperature applications will permanently bond with the carboxylic acid groups and will not release the carboxylic acid functionality to allow for crosslinking esterification.

Any of the aqueous binder compositions disclosed herein may further include an additive blend comprising one or more processing additives that improves the processability of the binder composition by reducing the tackiness of the binder, resulting in a more uniform insulation product with an increased tensile strength and hydrophobicity. Although there may be various additives capable of reducing the tackiness of a binder composition, conventional additives are hydrophilic in nature, such that the inclusion of such additives increases the overall water absorption of the binder composition. The additive blend may comprise one or more processing additives. Examples of processing additives include surfactants, glycerol, 1,2,4-butanetriol, 1,4-butanediol, 1,2-propanediol, 1,3-propanediol, poly(ethylene glycol) (e.g., Carbowax™) monooleate polyethylene glycol (MOPEG), silicone, dispersions of polydimethylsiloxane (PDMS), emulsions and/or dispersions of mineral, paraffin, or vegetable oils, waxes such as amide waxes (e.g., ethylene bis-stearamide (EBS)) and carnauba wax (e.g., ML-155), hydrophobized silica, ammonium phosphates, or combinations thereof. The surfactants may include non-ionic surfactants, including non-ionic surfactants with an alcohol functional groups. Exemplary surfactants include Surfynol®, alkyl polyglucosides (e.g., Glucopon®), and alcohol ethoxylates (e.g., Lutensol®).

The additive blend may include a single processing additive, a mixture of at least two processing additives, a mixture of at least three processing additives, or a mixture of at least four processing additives. In any of the embodiments disclosed herein, the additive blend may comprise a mixture of glycerol and polydimethylsiloxane.

The additive blend may be present in the binder composition in an amount from 1.0% to 20% by weight, from 1.25% to 17.0% by weight, or from 1.5% to 15.0% by weight, or from about 3.0% to 12.0% by weight, or from 5.0% to 10.0% by weight based on the total solids content in the binder composition. In any of the exemplary embodiments, the binder composition may comprise at least 7.0% by weight of the additive blend, including at least 8.0% by weight, and at least 9% by weight, based on the total solids content in the binder composition. Accordingly, in any of the exemplary embodiments, the aqueous binder composition may comprise 7.0% to 15% by weight of the additive blend, including 8.0% by weight to 13.5% by weight, 9.0% by weight to 12.5% by weight, based on the total solids content in the binder composition.

In embodiments wherein the additive blend comprises glycerol, the glycerol may be present in an amount from at least 5.0% by weight, or at least 6.0% by weight, or at least 7.0% by weight, or at least 7.5% by weight, based on the total solids content of the binder composition. In any of the exemplary embodiments, the binder composition may comprise 5.0 to 15% by weight of glycerol, including 6.5 to 13.0% by weight, 7.0 to 12.0% by weight, and 7.5 to 11.0% by weight of glycerol, based on the total solids content of the binder composition.

In embodiments wherein the additive blend comprises polydimethylsiloxane, the polydimethylsiloxane may be present in an amount from at least 0.2% by weight, or at least 0.5% by weight, or at least 0.8% by weight, or at least 1.0% by weight, or at least 1.5% by weight, or at least 2.0% by weight, based on the total solids content of the binder composition. In any of the exemplary embodiments, the binder composition may comprise 0.5 to 5.0% by weight of polydimethylsiloxane, including 1.0 to 4.0% by weight, 1.2 to 3.5% by weight, 1.5 to 3.0% by weight, and 1.6 to 2.3% by weight of polydimethylsiloxane, based on the total solids content of the binder composition.

In any of the embodiments disclosed herein, the additive blend may comprise a mixture of glycerol and polydimethylsiloxane, wherein the glycerol comprises 5.0 to 15% by weight of the binder composition and the polydimethylsiloxane comprises 0.5 to 5.0% by weight of the binder composition, based on the total solids content of the binder composition. In any of the embodiments disclosed herein, the additive blend may comprise a mixture of glycerol and polydimethylsiloxane, wherein the glycerol comprises 7.0 to 12% by weight of the binder composition and the polydimethylsiloxane comprises 1.2 to 3.5% by weight of the binder composition, based on the total solids content of the binder composition.

In any of the embodiments disclosed herein, the additive blend may comprise an increased concentration of a silane coupling agent. Conventional binder compositions generally comprise less than 0.5 wt. % silane and more commonly about 0.2 wt. % or less, based on the total solids content of the binder composition. Accordingly, in any of the embodiments disclosed herein, the silane coupling agent(s) may be present in the binder composition in an amount from to 5.0% by weight of the total solids in the binder composition, including from about 0.7% to 2.5% by weight, from 0.85% to 2.0% by weight, or from 0.95% to 1.5% by weight. In any of the embodiments disclosed herein, the silane coupling agent(s) may be present in the binder composition in an amount up to 1.0% by weight.

The silane concentration may further be characterized by the amount of silane on the fibers in a fibrous insulation product. Typically, fiberglass insulation products comprise between by weight and 0.03% by weight of the silane coupling agent on the glass fibers. However, by increasing the amount of silane coupling agent that is included applied to the fibers, the amount of silane on the glass fibers increases to at least 0.10% by weight.

Alternatively, the binder composition may comprise a conventional amount of silane coupling agent, if any. In such embodiments, the silane coupling agent(s) may be present in the binder composition in an amount from 0 to less than 0.5% by weight of the total solids in the binder composition, including from 0.05% to 0.4% by weight, from 0.1% to 0.35% by weight, or from 0.15% to 0.3% by weight.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyltriethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Any of the aqueous binder compositions disclosed herein may further include an esterification catalyst, also known as a cure accelerator. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphoric acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexametaphosphate, potassium phosphate, potassium tripolyphosphate, sodium trimetaphosphate, sodium tetrametaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst.

The catalyst may be present in the aqueous binder composition in an amount from about 0% to about 10% by weight of the total solids in the binder composition, including without limitation, amounts from about 1% to about 5% by weight, or from about 2% to about 4.5% by weight, or from about 2.8% to about 4.0% by weight, or from about 3.0% to about 3.8% by weight.

Optionally, the aqueous binder composition may contain at least one coupling agent. In at least one exemplary embodiment, the coupling agent is a silane coupling agent. The coupling agent(s) may be present in the binder composition in an amount from about 0.01% to about 5% by weight of the total solids in the binder composition, from about 0.01% to about 2.5% by weight, from about 0.05% to about 1.5% by weight, or from about 0.1% to about 1.0% by weight.

Non-limiting examples of silane coupling agents that may be used in the binder composition may be characterized by the functional groups alkyl, aryl, amino, epoxy, vinyl, methacryloxy, ureido, isocyanato, and mercapto. In any of the embodiments, the silane coupling agent(s) may include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyltriethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In any of the embodiments disclosed herein, the silane may comprise an aminosilane, such as γ-aminopropyltriethoxysilane.

The aqueous binder composition may further include a process aid. The process aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from 0 to about 10.0% by weight, from about 0.1% to about 5.0% by weight, or from about 0.3% to about 2.0% by weight, or from about 0.5% to 1.0% by weight, based on the total solids content in the binder composition. In some exemplary embodiments, the aqueous binder composition is substantially or completely free of any process aids.

Examples of process aids include defoaming agents, such as, emulsions and/or dispersions of mineral, paraffin, or vegetable oils; dispersions of polydimethylsiloxane (PDMS) fluids, and silica which has been hydrophobized with polydimethylsiloxane or other materials. Further process aids may include particles made of amide waxes such as ethylene bis-stearamide (EBS) or hydrophobized silica. A further process aid that may be utilized in the binder composition is a surfactant. One or more surfactants may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, perfluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluorononanoate, and perfluorooctanoate); cationic (e.g., alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzethonium chloride); and zwitterionic surfactants, quaternary ammonium salts (e.g., lauryl trimethyl ammonium chloride and alkyl benzyl dimethylammonium chloride), and polyoxyethylenealkylamines.

Suitable nonionic surfactants that can be used in conjunction with the binder composition include polyethers (e.g., ethylene oxide and propylene oxide condensates, which include straight and branched chain alkyl and alkaryl polyethylene glycol and polypropylene glycol ethers and thioethers); alkylphenoxypoly(ethyleneoxy)ethanols having alkyl groups containing from about 7 to about 18 carbon atoms and having from about 4 to about 240 ethyleneoxy units (e.g., heptylphenoxypoly(ethyleneoxy) ethanols, and nonylphenoxypoly(ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In at least one exemplary embodiment, the surfactants include one or more of Dynol 607, which is a 2,5,8,11-tetramethyl-6-dodecyne-5,8-diol, SURFONYL® 420, SURFONYL® 440, and SURFONYL® 465, which are ethoxylated 2,4,7,9-tetramethyl-5-decyn-4,7-diol surfactants (commercially available from Evonik Corporation (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis(2-ethylhexyl) sodium sulfosuccinate), and Triton™ CF-10 (poly(oxy-1,2-ethanediyl), alpha-(phenylmethyl)-omega-(1,1,3,3-tetramethylbutyl)phenoxy).

Optionally, the aqueous binder composition may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyethylene glycol, as well as any petroleum or non-petroleum oil with a high flash point to minimize the evaporation of the oil inside the oven.

The aqueous binder composition may include up to about 15 wt. % of a dust suppressing agent, including up to about 14 wt. %, or up to about 13 wt. %. In any of the embodiments disclosed herein, the aqueous binder composition may include between 1.0 wt. % and 15 wt. % of a dust suppressing agent, including about 3.0 wt. % to about 13.0 wt. %, or about 5.0 wt. % to about 12.8 wt. %.

The aqueous binder composition may also optionally include organic and/or inorganic acids and bases as pH adjusters in an amount sufficient to adjust the pH to a desired level. The pH may be adjusted depending on the intended application, to facilitate the compatibility of the ingredients of the binder composition, or to function with various types of fibers. In some exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a cross-linking agent. Organic and/or inorganic bases can be included to increase the pH of the binder composition. The bases may be volatile or non-volatile bases. Exemplary volatile bases include, for example, ammonia and alkyl-substituted amines, such as methyl amine, ethylamine or 1-aminopropane, dimethyl amine, and ethyl methyl amine. Exemplary non-volatile bases include, for example, sodium hydroxide, potassium hydroxide, sodium carbonate, and t-butylammonium hydroxide.

When in an un-cured state, the pH of the binder composition may range from about 2.0 to about 5.0, including all amounts and ranges in between. In any of the embodiments disclosed herein, the pH of the binder composition, when in an un-cured state, is about 2.2-4.0, including about 2.5-3.8, and about 2.6-3.5. After cure, the pH of the binder composition may rise to at least a pH of 5.0, including levels between about 6.5 and 8.8, or between about 6.8 and 8.2.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. It has been discovered that the present binder composition may contain a lower solids content than traditional phenol-urea formaldehyde or carbohydrate-based binder compositions. In particular, the binder composition may comprise 5% to 35% by weight of binder solids, including without limitation, 10% to 30%, 12% to 20%, and 15% to 19% by weight of binder solids. This level of solids indicates that the subject binder composition may include more water than traditional binder compositions.

In some exemplary embodiments, the binder composition can be processed at a high ramp moisture level (about 8%-10%) and requires less moisture removal than traditional binder compositions. However, in some exemplary embodiments, the binder composition may have a low viscosity, which allows for a reduction in the ramp moisture level. In some exemplary embodiments, the aqueous binder composition demonstrates a viscosity, at a temperature of 25° C., no greater than 70 cP at 25° C. and 40% solids or less, such as no greater than 65 cP, no greater than 60 cP, no greater than 55 cP, or no greater than 50 cP. A low binder viscosity allows for a reduction in ramp moisture to less than 8%, less than 7%, less than 6%, less than 5%, less than 4%, less than 3%, less than 2%, or less than 1% ramp moisture level. In some exemplary embodiment, the ramp moisture is zero or essentially zero, meaning a ramp moisture level of no greater than 0.5%. A binder composition having a viscosity as low as possible applied at a high concentration allows for the removal of high amounts of moisture on the ramp, allowing the preparation of a tough binder without brittleness.

In other exemplary embodiments, the aqueous binder composition demonstrates a viscosity, at a temperature of 25° C., between 200 cP and 600 cP at 25° C. and 40% solids, including between 300 cP and 500 cP at 25° C. and 40% solids, and between 350 cP and 450 cP at 25° C. and 40% solids.

The binder content may be measured as loss on ignition (LOI). In any of the embodiments disclosed herein, the LOI is 1% to 20%, including without limitation, 5.5% to 17%, 8% to 15%, and 10% to 14.5%. The particular LOI of a product is largely dependent on the type of product being produced.

The binder composition may be present in an amount of less than or equal to 10% by weight of the fibrous insulation product 100, or less than or equal to 8% by weight of the fibrous insulation product 100 or less than or equal to 6% by weight of the fibrous insulation product 100. In one exemplary embodiment, the fibrous insulation product 100 includes a collection of unwoven glass fibers and less than 10% by weight of a formaldehyde-free binder. In some exemplary embodiments, the cured fibrous insulation product 100 has in the range of from 2% by weight to 10% by weight of the binder composition. In some exemplary embodiments, the cured fibrous insulation product 100 has in the range of from 3.5% by weight to 6% by weight of the binder composition, or in the range of 3.5% to 4% by weight of the binder composition. The relatively low amount of binder contributes to the flexibility of the final insulation product.

In an exemplary embodiment, the fibrous insulation product 100 may be formed as a residential insulation product, such as an insulation batt, that has properties, such as recovery, stiffness, handling, etc., which are suitable for use as residential insulation. In the exemplary embodiment, the fibrous insulation product 100 may include glass fibers 130 having an average fiber diameter, prior to the application of the binder composition, of greater than or equal to 3.81 μm (15.0 HT) to 4.82 μm (19.0 HT). In some exemplary embodiments, the fibrous insulation product 100 includes glass fibers 130 having an average fiber diameter in the range of 3.81 μm (15.0 HT) to 4.57 μm (18.0 HT), in the range of 4.06 μm (16.0 HT) to 4.82 μm (19.0 HT), or in the range of 4.32 μm (17.0 HT) to 4.82 μm (19.0 HT).

The procedure used to measure the fiber diameters of the glass fibers 130 utilizes a scanning electron microscope (SEM) to directly measure fiber diameter. In general, a specimen of the fibrous insulation product 100 is heated to remove any organic materials (e.g., binder composition), the glass fibers from the specimen are then reduced in length and photographed by the SEM. The diameters of the fibers are then measured from the saved images by imaging software associated with the SEM.

More specifically, a specimen of the fibrous insulation product 100 is heated to 800 degrees F. for a minimum of 30 minutes. The specimen may be heated longer if required to ensure removal of any organic materials. The specimen is them cooled to room temperature and the glass fibers are reduced in length in order to fit onto an SEM planchette. The glass fibers may be reduced in length by any suitable method, such as for example, cut by scissors, chopped by a razor blade, or ground in a mortar and pestle. The glass fibers are then adhered to the surface of the Sem planchette such that the fibers are not overlapping or spaced too far apart.

Once the specimen is prepared for imaging, the specimen is mounted in the SEM using normal operating procedures and photographed by the SEM at appropriate magnification for the diameter size of the fibers being measured. A sufficient number of images are collected and saved to ensure enough fibers are available for measuring. For example, 10 to 13 images may be required where 250 to 300 fibers are being measured. The fiber diameters are then measured using an SEM image analysis software program, such as for example, Scandium SIS imaging software. Average fiber diameter of the specimen is then determined from the number of fibers measured. The fibrous insulation product specimen may include glass fibers that are fused together (i.e., two or more fibers joined along their lengths). For the purpose of calculating the average fiber diameter of specimens in the present disclosure, fused fibers are treated as single fibers.

An alternative procedure used to measure the average fiber diameter of the glass fibers 130 utilizes a device that measures air flow resistance to indirectly determine the mean or "effective" fiber diameter of the randomly distributed fibers in a specimen. More specifically, in one embodiment of the alternative procedure, a specimen of the fibrous insulation product 100 is heated to 800-1000 degrees F. for 30 minutes. The specimen may be heated longer if required to ensure removal of any organic materials. The specimen is then cooled to room temperature and a test specimen weighing about 7.50 grams is loaded into the device's chamber. A constant air flow is applied through the chamber, and once the air flow has stabilized, the differential pressure, or pressure drop, is measured by the device. Based on the air flow and differential pressure measurements, the device can compute the average fiber diameter of the specimen.

The exemplary fibrous insulation product 100 may be formed as a batt or blanket having appropriate R-values, such as in the range of 10 to 54, and thicknesses, such as for example in the range of 2 inches to 18 inches, for use as residential or commercial insulation by tailoring certain properties of the product, such as fiber diameter, density (pcf), product area weight (pounds per square foot), and binder content. For example, an insulation batt having a thickness of 3.5 inch and R-value of 11 may be formed utilizing glass fibers 130 having an average fiber diameter the range of 3.81 μm (15.0 HT) to 4.82 μm (19.0 HT), by matching the density (pcf) and product area weight (pounds per square foot) to a specific fiber diameter and binder content.

The density of the fibrous insulation product 100 may vary in different embodiments. As used in this application, the density of the fibrous insulation product is the density after the binder composition has been cured and the cured product being in a free state (i.e., not compressed or stretched). In various embodiments, the density of the fibrous insulation product 100 is in the range of 0.3 pcf to 2.7 pcf, or in the range of 0.3 pcf to 2.0 pcf.

In some embodiments, the fibrous insulation product is a batt having an uncompressed thickness in the range of 2 inches to 3.5 inches, an R-value greater than or equal to 11, and a density less than or equal to 0.44 pcf. In some embodiments, the fibrous insulation product is a batt having an uncompressed thickness in the range of 2 inches to 3.5 inches, an R-value of the greater than or equal to 13, and a density less than or equal to 0.69 pcf. In some embodiments, the insulation product is a batt having an uncompressed thickness in the range of 2 inches to 3.5 inches, an R-value greater than or equal to 15, and a density less than or equal to 1.41 pcf. In some embodiments, the fibrous insulation product is a batt having an uncompressed thickness in the range of 2 inches to 6.25 inches, an R-value greater than or equal to 19, and a density of the batt is less than or equal to 0.41 pcf. In some embodiment, the fibrous insulation product is a batt having an uncompressed thickness in the range of 2 inches to 5.5 inches, an R-value greater than or equal to 20, and a density of the batt is less than or equal to 0.65 pcf. In some embodiments, the fibrous insulation product is a batt having an uncompressed thickness in the range of 2 inches to 5.5 inches, an R-value greater than or equal to 21, and a density less than or equal to 0.75 pcf. In some embodiments, the fibrous insulation product is a batt having an uncompressed thickness in the range of 2 inches to 9.5 inches, an R-value greater than or equal to 30, and a density less than or equal to 0.45 pcf. In some embodiments, the fibrous insulation product is a batt having an uncompressed thickness of 12.0 inches, an R-value greater than or equal to 38, and a density less than or equal to 0.45 pcf. In some embodiments, the fibrous insulation product is a batt having an uncompressed thickness in the range of 2 inches to 14.0 inches, an R-value greater than or equal to 49, and a density less than or equal to 0.57 pcf.

In some exemplary embodiments, the disclosed fiberglass insulation product 100 has a stiffness of 75 degrees or less, or 60 degrees or less, or 45 degrees or less, or 30 degrees or less. The stiffness of the fiberglass insulation product 100 is measured by suspending a specimen of the fiberglass insulation product over a center support and measuring the angle that the ends of the specimen deflect downward. The procedure is applicable to faced and unfaced insulation products and specimens sized to about 48 inches long and up to about 24 inches wide. In particular, the procedure utilizes a 24-inch long 2×6 beam (5.5 inches wide) arranged parallel to the floor. A 48-inch long specimen of the insulation product 100 is laid on top of the 2×6 beam parallel to the floor such that the middle of the specimen is centered on the 2×6 beam and the two ends of the specimen are free to hang down along either side of the beam. The angle of each end of the specimen is then measured as it hangs freely on the 2×6 beam, such as for example, by providing a 90-degree angle scale perpendicular to and below the 2×6 beam to visually determine the angle of each end. Stiffer insulation products have stiffness angles closer to 0 degrees as the two free ends of the insulation product 100 remain more parallel with the floor when freely supported by the 2×6 beam in the center. Less stiff products sag across the 2×6 beam and the ends becomes more perpendicular to the floor with stiffness angles closer to 90 degrees.

In an exemplary embodiment, the fibrous insulation product 100 is formed as a batt having a plurality of randomly-oriented glass fibers held together by a binder composition. The glass fibers have an average fiber diameter in the range of 3.81 µm (15.0 HT) to 4.82 µm (19.0 HT), and the fibrous insulation product has less than 10% by weight of a formaldehyde-free binder. In one exemplary embodiment, the fibrous insulation product 100 has in the range of 3.0% to 4.0% by weight of a formaldehyde-free binder.

In some exemplary embodiments, the batt has a width in the range of 11.25 inches to 24.25 inches, a length in the range of 47 inches to 106 inches, and a thickness in the range of 3 inches to 4 inches. In one exemplary embodiment, the batt is non-encapsulated (i.e., not surrounded by cover, such as a vapor barrier). The batt has a maximum R-value per inch of greater than or equal to 4.6 and a stiffness of less than or equal to 30 degrees.

In some exemplary embodiments, the fibrous insulation product 100 is designed to produce less prickle than known, comparable fibrous insulation products. As used in this application, "prickle" refers to the mechanical stimulation of nerve endings in the skin of a person. Without wishing to be bound by theory, the particular nerve endings associated with prickle are believed to be triggered by a sufficient force applied perpendicular to the skin surface and the presence of a relatively small number of such stimuli per unit area of the skin surface is enough to trigger the sensation of prickle. For example, the ends of fibers that form a fibrous insulation product may protrude from the surface of the fibrous insulation product. These ends of the fibers, when contacting the skin of a person, such as an installer, act mechanically as Euler rods. If the fiber ends can sustain sufficient force before buckling, the ends can trigger the nerve endings and cause prickle. Thus, the diameter of the fibers, the stiffness of the fibers, and the number of fiber ends that protrude are among the variables that can impact prickle. Without wishing to be bound by theory, the arrangement of the fibers (i.e., the morphology) in the fibrous insulation product is believed to impact the propensity of a fibrous insulation product to cause prickle. For example, a higher degree of entanglement of the fibers may result in a lower number of protruding fiber ends resulting in less prickle.

The propensity of a fibrous insulation product to cause prickle can be measured by a Wool Comfort Meter (WCM) in accordance with International Wool Textile Organization (IWTO) testing standard IWTO-66-2017. The WCM measures a test specimen and produces a single numeric comfort factor (CF) value. The comfort factor is measured at five different locations on the specimen and the average reading is recorded as the comfort factor value for the specimen. A lower comfort factor value indicates less propensity to produce prickle.

Table 4 illustrates comfort factor values for five prior art fibrous insulation specimens (A1-A5) and five exemplary embodiments of fibrous insulation products according the present disclosure (B1-B5). The specimens were tested in accordance with IWTO-66-2017 with a couple minor modifications. Minor specimen preparation modifications were taken in order to test the largest size insulation specimen as possible with the WCM. In particular, insulation specimens were cut to the L 15.75"×W 8.67", and then bisected to 1.5" thickness to fit under the WCM testing head. This is a slight modification to the length and width for IWTO-66-2017 that uses 300 mm×300 mm specimens (11.8"×11.8") and nominal thicknesses for fabrics. The only instrument modification needed was that the WCM's specimen stage needed to be removed to fit the relatively thicker 1.5" specimen under the testing head. No other modifications were made to the testing method or instrument.

Table 4 also includes the average fiber diameter/density values (Fd/D) for listed specimens. The fiber diameters are listed in HT and the density is listed in pcf. The average fiber diameter was measured via the SEM method described above. The density is measured after the binder composition has been cured and the cured product is in a free state (i.e., not compressed or stretched).

TABLE 4

R-Value, Avg. Fiber Diameter/Density Ratio, and Comfort Factor

| Specimen | R-Value | Avg. Fiber Diameter/Density (HT/pcf) | Comfort Factor, CF |
|---|---|---|---|
| A1 | 19 | 50.0 | 267 |
| A2 | 30 | 32.0 | 243 |
| A3 | 30 | 28.8 | 170 |
| A4 | 13 | 30.2 | 192 |
| A5 | 17.6 | 14.6 | 150 |
| B1 | 19 | 35.8 | 131 |
| B2 | 28 | 32.3 | 74 |
| B3 | 12 | 28.8 | 75 |
| B4 | 24 | 14.5 | 57 |
| B5 | 20 | 35.1 | 140 |

Figure 3:
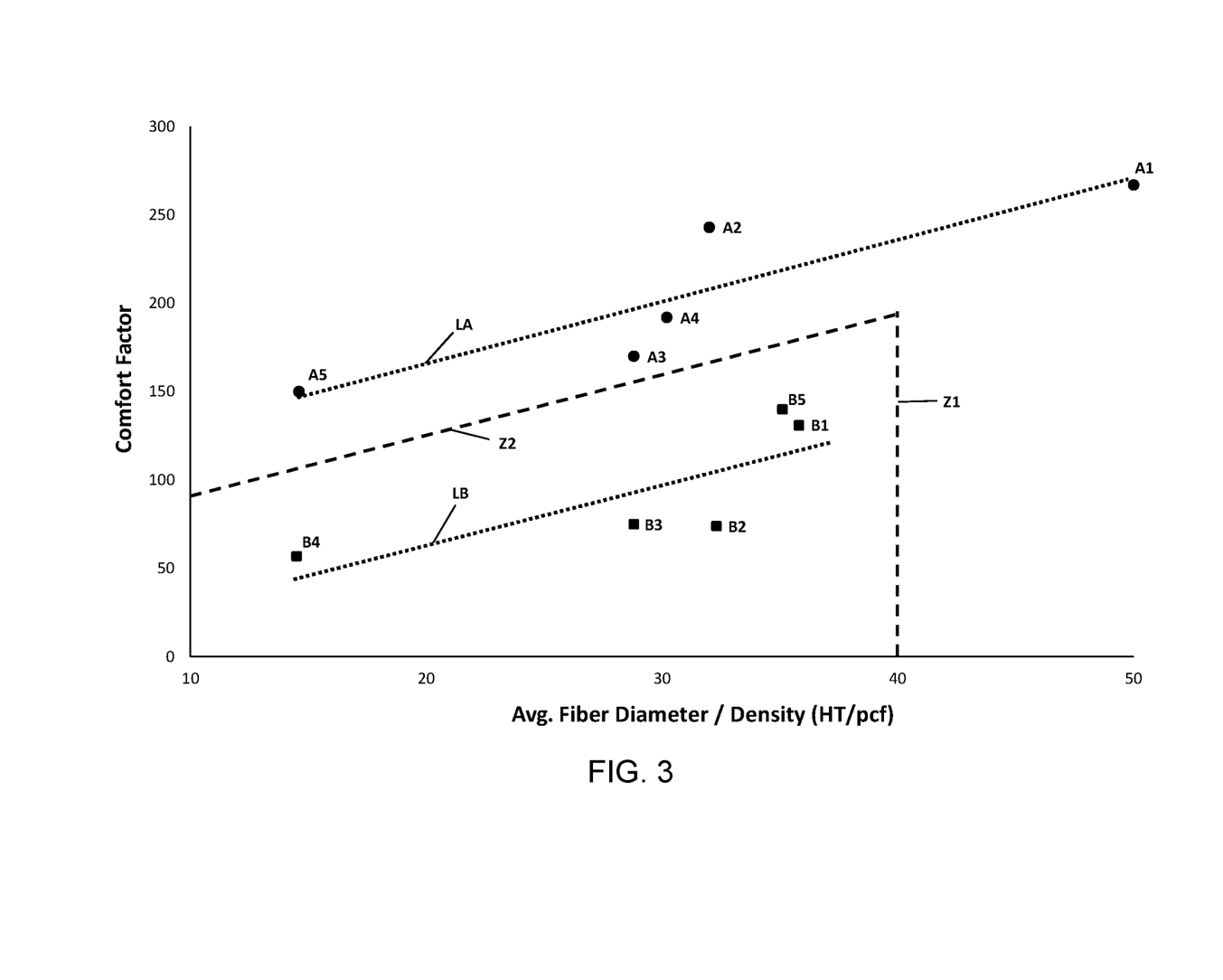
FIG. 3 is a graph of comfort factor vs. average fiber diameter/density for fibrous insulation specimens.

Referring to FIG. 3, the comfort factor is plotted vs. average Fd/D for the data in Table 4. As shown in FIG. 3, the least-squares regression line LA for specimens A1-A5 and least-squares regression line LB for specimens B1-B5 show, generally, that the comfort factor increases with increasing values of Fd/D. The least-squares regression line LB is defined by the equation CF=3.417(Fd/D)−4.8, having a coefficient of determination ($R^2$) of 90% and p-values of 0.004 or less. FIG. 3 illustrates a first zone which is representative of the comfort factor values for exemplary embodiments of the fibrous insulation products according to the present disclosure. The first zone is bounded on the X-axis at a maximum Fd/D of 40 HT/pcf, as shown by dashed line Z1, and is bounded on the Y-axis by the dashed line Z2 defined by the equation CF=3.417(Fd/D)+60, which is a line parallel to the least-squares regression line LB. As shown in FIG. 3, the first zone encompasses all of the specimens B1-B5 and excludes all of the prior art fibrous insulation specimens (A1-A5).

The fiberglass insulation materials of the present invention may have any combination or sub-combination of the properties disclosed and the ranges for those properties disclosed herein. While the present invention has been illustrated by the description of embodiments thereof, it is not the intention of the applicant to restrict or in any way limit the scope of the appended claims to such detail. Additional advantages and modifications will readily appear to those skilled in the art. While the fibrous insulation product has been illustrated herein as a flexible batt or blanket, other configurations and geometries can be used. Further, the fibrous insulation product may be used in a variety of ways and is not limited to any specific application. Therefore, the invention, in its broader aspects, is not limited to the specific details, the representative apparatus, and illustrative examples shown and described. Accordingly, departures can be made from such details without departing from the spirit or scope of the general inventive concepts.

The invention claimed is:

1. A fibrous insulation product comprising:
   a plurality of randomly oriented glass fibers; and
   a binder composition that holds the glass fibers together;
   wherein a quantity of the binder composition is in the range of 2% to 10% by weight of the fibrous insulation product; and
   wherein the binder composition comprises a polymeric polycarboxylic acid-based cross-linking agent and a monomeric polyol having at least four hydroxyl groups with a molar ratio of carboxylic acid groups to hydroxyl groups between 0.6/1 to 1/0.6;
   wherein an R-value of the fibrous insulation product is in the range of 10 to 54;
   wherein the fibrous insulation product has a thickness in the range 2 inches to 18 inches;
   wherein the fibrous insulation product, after curing, has a density, when uncompressed, in the range of 0.30 pcf to 2.7 pcf; and
   wherein the fibrous insulation product has an average fiber diameter to density ratio (Fd/D) of less than or equal to 40 and a comfort factor of less than or equal to 3.417 (Fd/D)+60.

2. The fibrous insulation product of claim 1, wherein the comfort factor is less than or equal to 120 and the fiber diameter to density ratio is less than or equal to 25.

3. The fibrous insulation product of claim 1, wherein the fibrous insulation product is formed by a single ply of the randomly oriented glass fibers.

4. The fibrous insulation product of claim 1, wherein the fibrous insulation product is formed by no more than two plies of the randomly oriented glass fibers.

5. The fibrous insulation product of claim 1, wherein the comfort factor is less than or equal to 3.417 (Fd/D)+20.

6. The fibrous insulation product of claim 1, wherein the R-value of the fibrous insulation product is in the range of 10 to 16.

7. The fibrous insulation product of claim 1, wherein the R-value of the fibrous insulation product is in the range of 32 to 54.

8. The fibrous insulation product of claim 1, wherein the fibrous insulation product is a batt having an uncompressed thickness in the range of 2 inches to 3.5 inches, wherein the R-value of the batt is greater than or equal to 11, and wherein the density of the batt is less than or equal to 0.44 pcf.

9. The fibrous insulation product of claim 1, wherein the fibrous insulation product is a batt having an uncompressed thickness in the range of 2 inches to 6.25 inches, wherein the R-value of the batt is greater than or equal to 19, and wherein the density of the batt is less than or equal to 0.41 pcf.

10. The fibrous insulation product of claim 1, wherein the fibrous insulation product is a batt having an uncompressed thickness in the range of 2 inches to 9.5 inches, wherein the R-value of the batt is greater than or equal to 30, and wherein the density of the batt is less than or equal to 0.45 pcf.

11. The fibrous insulation product of claim 1, wherein the fibrous insulation product is a batt having an uncompressed thickness of 12.0 inches, wherein the R-value of the batt is greater than or equal to 38, and wherein the density of the batt is less than or equal to 0.45 pcf.

12. The fibrous insulation product of claim 1, wherein the fibrous insulation product is a batt having an uncompressed thickness in the range of 2 inches to 3.5 inches, wherein the R-value of the batt is greater than or equal to 11, and wherein an area weight of the batt is less than or equal to 0.13 psf.

13. The fibrous insulation product of claim 1, wherein the fibrous insulation product is a batt having a stiffness that is less than or equal to 75 degrees.

14. A building frame comprising:
a plurality of parallel, spaced apart framing members;
a fibrous insulation batt received between two of the framing members, the fibrous insulation batt comprising:
  a plurality of randomly oriented glass fibers; and
  a binder composition that holds the glass fibers together;
  wherein the binder composition comprises a polymeric polycarboxylic acid-based cross-linking agent and a monomeric polyol having at least four hydroxyl groups with a molar ratio of carboxylic acid groups to hydroxyl groups between 0.6/1 to 1/0.6;
  wherein the fibrous insulation batt, after curing, has a density, when uncompressed, in the range of 0.30 pcf to 2.7 pcf;
  wherein a quantity of the binder composition is in the range of 2% to 10% by weight of the fibrous insulation batt;
  wherein an R-value of the fibrous insulation batt is in the range of 10 to 54; and
  wherein the fibrous insulation batt has an average fiber diameter to density ratio (Fd/D) of less than or equal to 40 and a comfort factor of less than or equal to 3.417 (Fd/D)+60.

15. The building frame of claim 14, wherein the fibrous insulation product has a thickness in the range 2 inches to 18 inches.

16. The building frame of claim 14, wherein the fibrous insulation batt has an uncompressed thickness in the range of 2 inches to 3.5 inches, wherein the R-value of the fibrous insulation batt is greater than or equal to 11, and wherein the density of the fibrous insulation batt is less than or equal to 0.44 pcf.

17. The building frame of claim 14, wherein the comfort factor is less than or equal to 120 and the fiber diameter/density ratio is less than or equal to 25.

18. The fibrous insulation product of claim 1, wherein the fibrous insulation product is a batt having an uncompressed thickness larger than 6.25 inches.

* * * * *